(12) United States Patent
Elshafie et al.

(10) Patent No.: US 11,659,585 B1
(45) Date of Patent: May 23, 2023

(54) CHANNEL STATE INFORMATION REPORT FIELD PRIORITIZATION SCHEME

(71) Applicant: QUALCOMM Incorporated, San Diego, CA (US)

(72) Inventors: Ahmed Elshafie, San Diego, CA (US); Alexandros Manolakos, Escondido, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 17/452,926

(22) Filed: Oct. 29, 2021

(51) Int. Cl.
*H04W 72/04* (2023.01)
*H04W 72/542* (2023.01)
*H04W 12/0431* (2021.01)
*H04W 72/044* (2023.01)
*H04W 72/20* (2023.01)
*H04W 72/56* (2023.01)

(52) U.S. Cl.
CPC ..... *H04W 72/542* (2023.01); *H04W 12/0431* (2021.01); *H04W 72/044* (2013.01); *H04W 72/20* (2023.01); *H04W 72/56* (2023.01)

(58) Field of Classification Search
None
See application file for complete search history.

(56) References Cited

U.S. PATENT DOCUMENTS

| 2011/0249584 A1* | 10/2011 | Barbieri | H04W 72/541 370/252 |
| 2020/0295812 A1* | 9/2020 | Rahman | H04B 7/0626 |
| 2022/0225158 A1* | 7/2022 | Park | H04W 4/40 |

FOREIGN PATENT DOCUMENTS

| CA | 2342573 A1 * | 10/2001 | G06Q 10/10 |
| CN | 111431682 B  * | 2/2022 | H04L 5/0044 |
| WO | WO-2020184971 A1 * | 9/2020 | H04B 7/0417 |

* cited by examiner

*Primary Examiner* — Kodzovi Acolatse
(74) *Attorney, Agent, or Firm* — MG-IP Law, P.C.

(57) ABSTRACT

Disclosed are techniques for wireless communication. In an aspect, BS determines a channel state information (CSI) report field priority-based security scheme, and transmits CSI report field priority-based security scheme to UE. UE determines bit availability in CI (e.g., UCI or SCI or MAC CE) for transmission of a CSI report. UE configures, based on the CSI report field priority-based security scheme and the CI bit availability, the CSI report with first field(s) (e.g., secured with key) being secured via a key and second field(s) being unsecured (e.g., not secured with any key or secured with weaker key below strength threshold). UE transmits the CSI report to BS.

30 Claims, 16 Drawing Sheets

US 11,659,585 B1

CHANNEL STATE INFORMATION REPORT FIELD PRIORITIZATION SCHEME

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Secure communications are very important in wireless communications systems. For example, IoT makes security more crucial since many devices will be connected to each other. Given the level of power of such devices, adding more security with additional secure bits obtained from channels and sounding signals between legit nodes may be beneficial. For example, such security may prohibit a potential eavesdropper UE from monitoring the respective communications. While current systems provide such security for certain L3 communications, security for physical (PHY) layer (or L1) (e.g., DCI, UCI, PUCCH, PSCCH, etc.) is not currently supported.

In some designs, a UE can maintain some key bits to secure its UL/SL transmissions, which may either be unsecured such as UCI carried in PUCCH or PSFCH in SL or SCI-1/2 in SL, or L3 secured such as data in PUSCH/PSSCH. In some cases, a UE can be asked to report CSI on PUCCH, e.g., multiple reports on one or more PUCCH resources. In such cases, it may be difficult to secure the CSI report via a secret key, given the limited bit availability for the secret key bits (e.g., new secret keys may be provided by gNB and/or between UEs at some time interval).

In some scenarios, two or more CSI report transmissions may "collide", in the sense that the two or more CSI report transmissions are scheduled to be transmitted simultaneously (for instance a periodic and an aperiodic). Also, a number of CSI reports scheduled to be transmitted simultaneously may result in too large payload size that cannot fit in the UCI container (for instance due to that HARQ-ACK and/or SR additionally needs to be multiplexed). In such cases, some CSI reports may be dropped so as to fit into the UCI container (or payload).

Aspects of the disclosure are thereby directed to a CSI report field priority-based security scheme for a CSI report with multiple fields. Instead of omitting particular CSI reports, a UE may selectively secure higher priority CSI report fields while leaving other CSI report fields to conserve bits. Such aspects may provide various technical advantages, such as avoiding the need to drop entire CSI reports.

In an aspect, a method of operating a user equipment (UE) includes receiving a channel state information (CSI) report field priority-based security scheme for a CSI report with multiple fields; determining bit availability in control information (CI) for transmission of the CSI report; configuring, based on the CSI report field priority-based security scheme and the CI bit availability, the CSI report with a first subset of the multiple fields being secured via a key and a second subset of the multiple fields being unsecured; and transmitting the CSI report.

In an aspect, a method of operating a communications device includes determining a channel state information (CSI) report field priority-based security scheme for a CSI report with multiple fields; transmitting, to a user equipment (UE), an indication of the CSI report field prioritization scheme; and receiving the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

In an aspect, a user equipment (UE) includes a memory; at least one transceiver; and at least one processor communicatively coupled to the memory and the at least one transceiver, the at least one processor configured to: receive, via the at least one transceiver, a channel state information (CSI) report field priority-based security scheme for a CSI report with multiple fields; determine bit availability in control information (CI) for transmission of the CSI report; configure, based on the CSI report field priority-based security scheme and the CI bit availability, the CSI report with a first subset of the multiple fields being secured via a key and a second subset of the multiple fields being unsecured; and transmit, via the at least one transceiver, the CSI report.

In an aspect, a communications device includes a memory; at least one transceiver; and at least one processor communicatively coupled to the memory and the at least one transceiver, the at least one processor configured to: determine a channel state information (CSI) report field priority-based security scheme for a CSI report with multiple fields; transmit, via the at least one transceiver, to a user equipment (UE), an indication of the CSI report field prioritization scheme; and receive, via the at least one transceiver, the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

In an aspect, a user equipment (UE) includes means for receiving a channel state information (CSI) report field priority-based security scheme for a CSI report with multiple fields; means for determining bit availability in control information (CI) for transmission of the CSI report; means for configuring, based on the CSI report field priority-based security scheme and the CI bit availability, the CSI report with a first subset of the multiple fields being secured via a key and a second subset of the multiple fields being unsecured; and means for transmitting the CSI report.

In an aspect, a communications device includes means for determining a channel state information (CSI) report field priority-based security scheme for a CSI report with multiple fields; means for transmitting, to a user equipment (UE), an indication of the CSI report field prioritization (UE); and means for receiving the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

In an aspect, a non-transitory computer-readable medium storing computer-executable instructions that, when executed by a user equipment (UE), cause the UE to: receive a channel state information (CSI) report field priority-based security scheme for a CSI report with multiple fields; determine bit availability in control information (CI) for transmission of the CSI report; configure, based on the CSI report field priority-based security scheme and the CI bit availability, the CSI report with a first subset of the multiple fields being secured via a key and a second subset of the multiple fields being unsecured; and transmit the CSI report.

In an aspect, a non-transitory computer-readable medium storing computer-executable instructions that, when executed by a communications device, cause the communications device to: determine a channel state information (CSI) report field priority-based security scheme for a CSI report with multiple fields; transmit, to a user equipment (UE), an indication of the CSI report field prioritization scheme; and receive the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
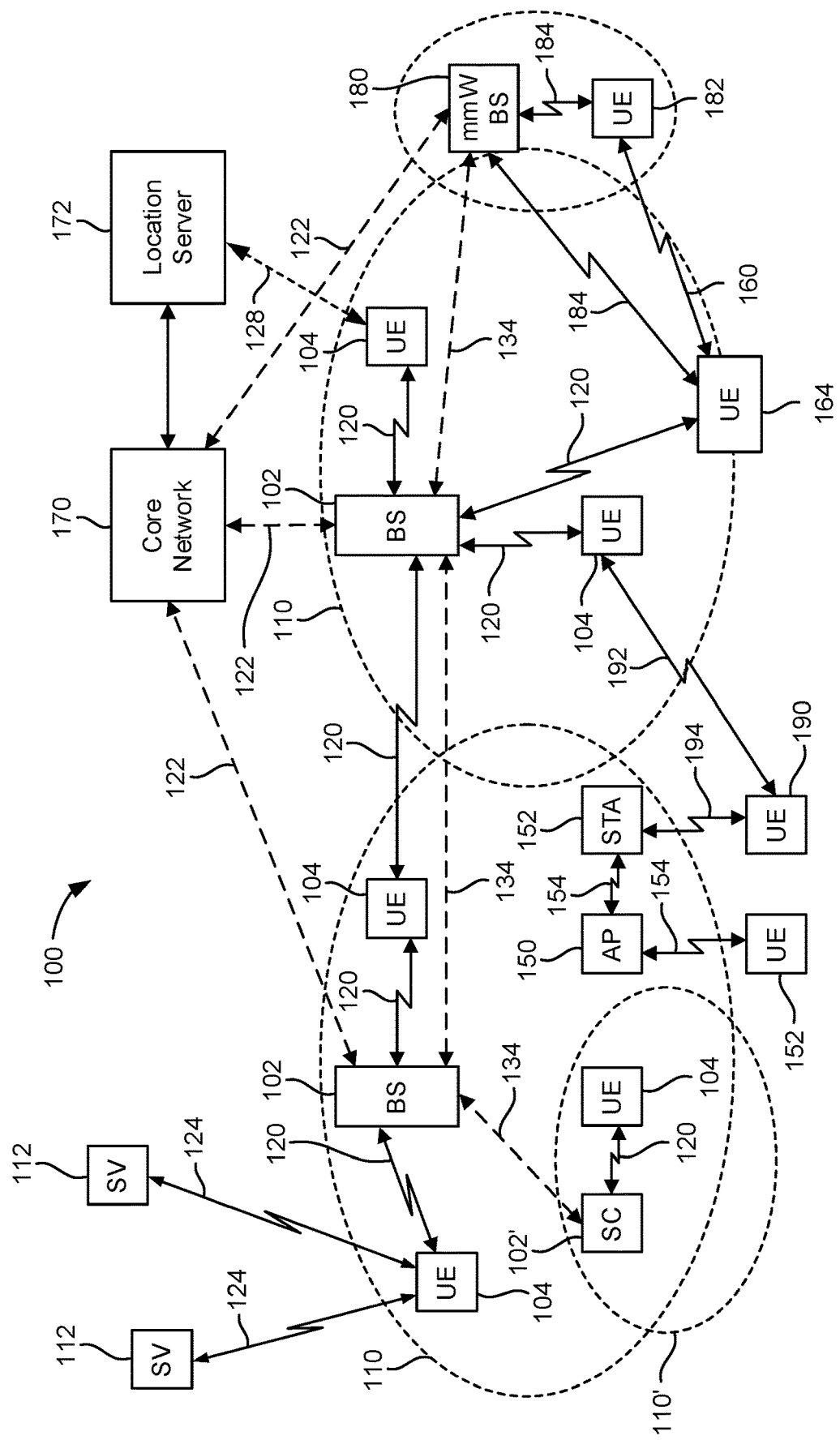
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
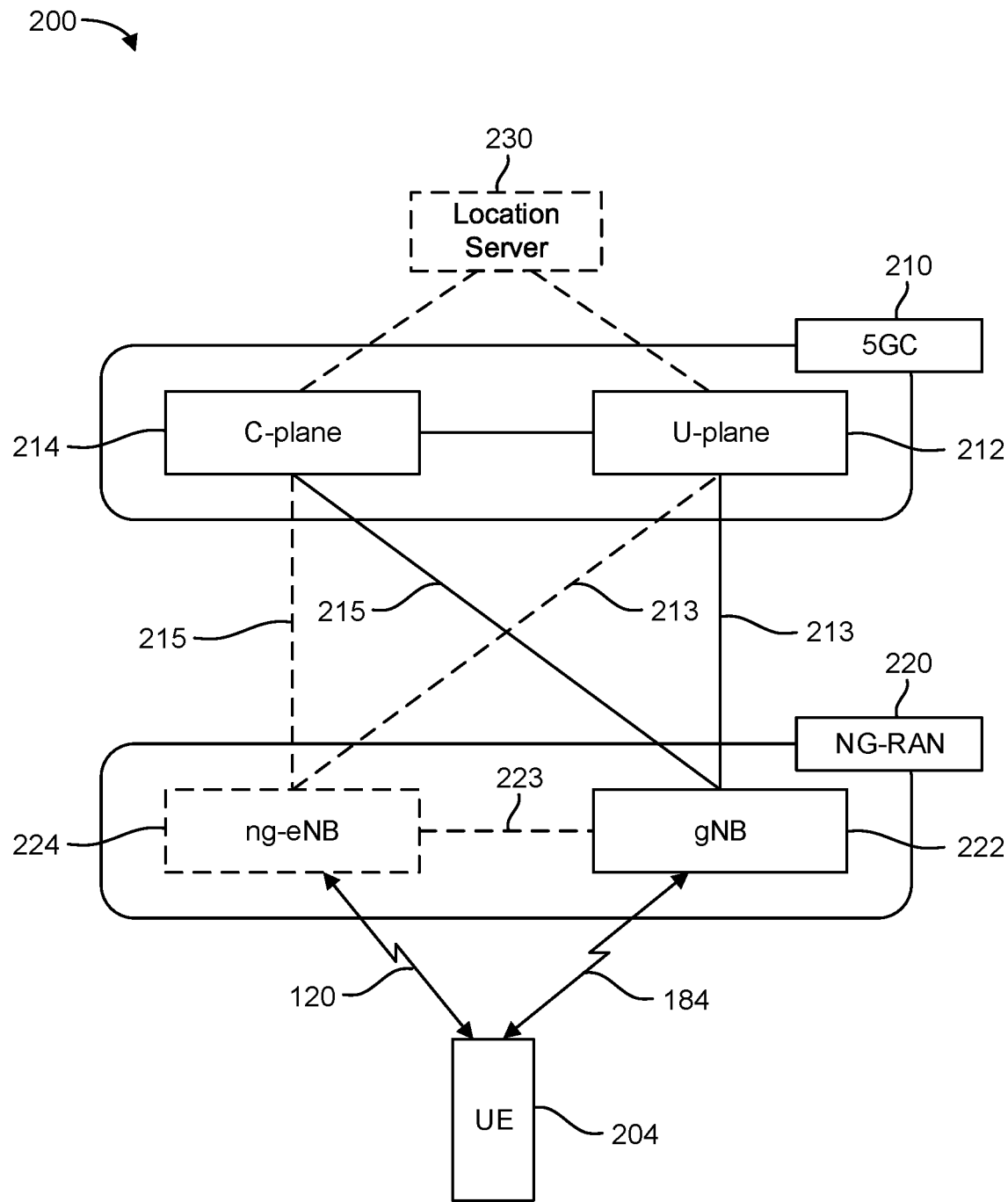
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
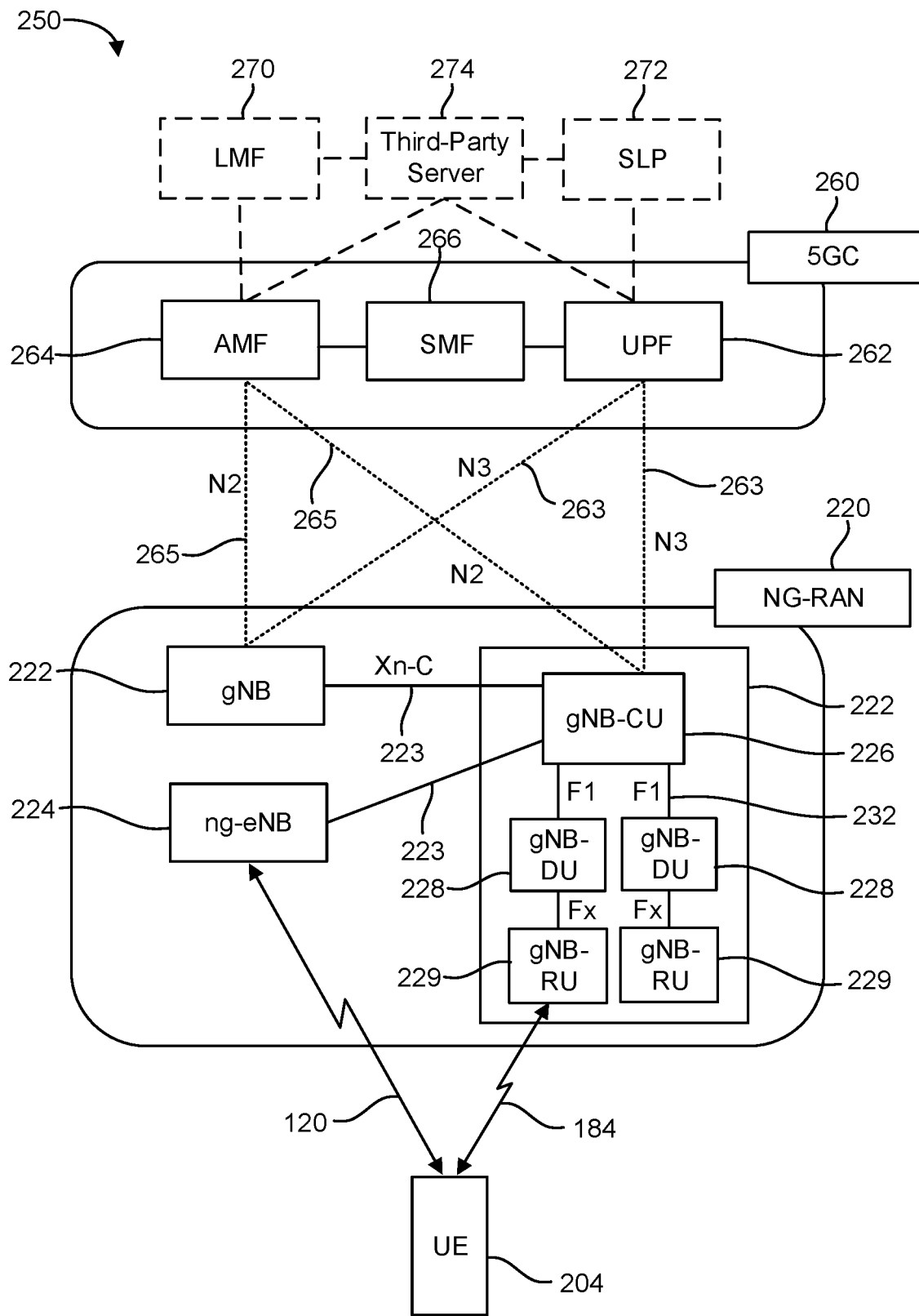

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
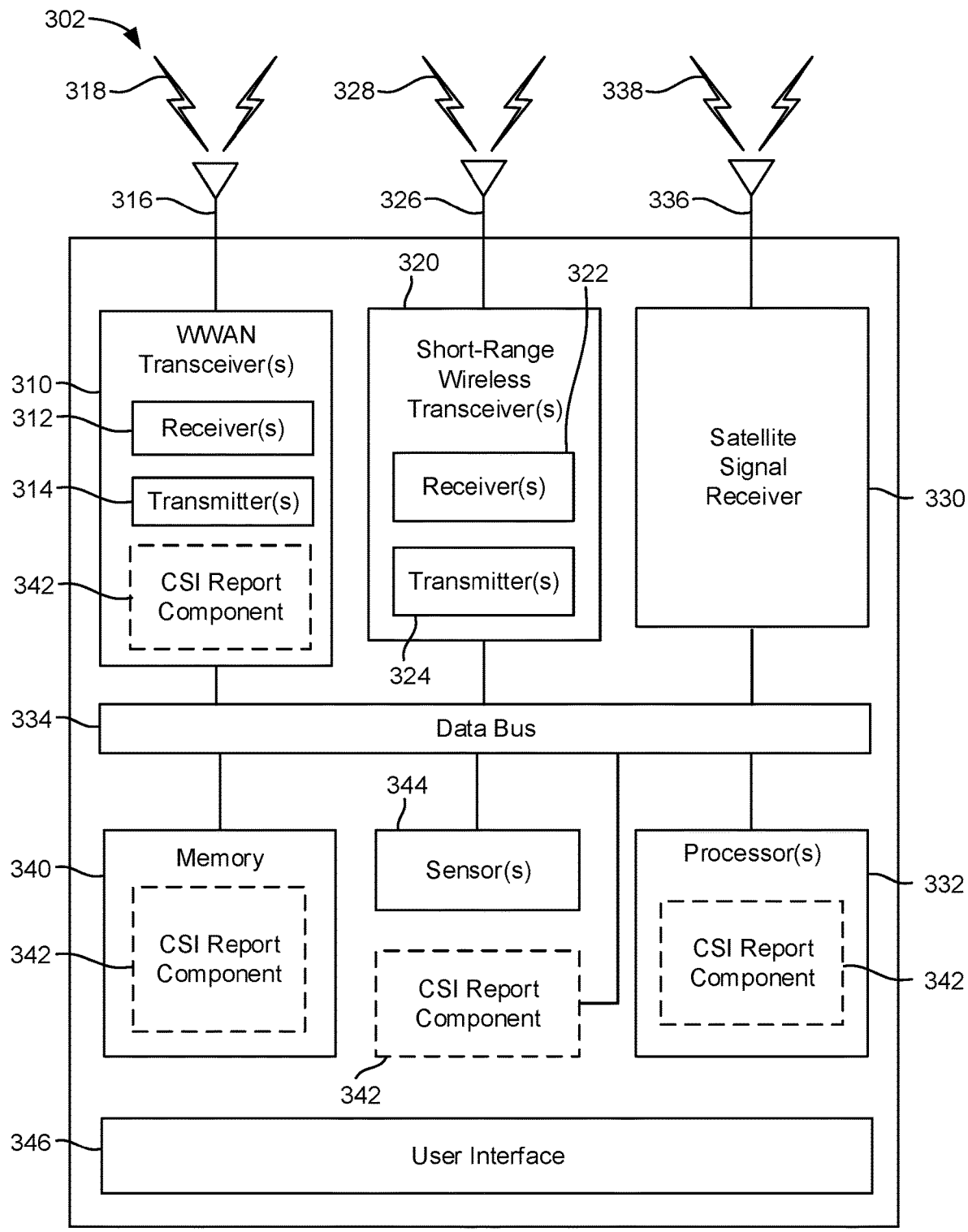
FIGS. 3A, 3B, and 3C are simplified block diagrams of several sample aspects of components that may be employed in a user equipment (UE), a base station, and a network entity, respectively, and configured to support communications as taught herein.
Figure 3B:
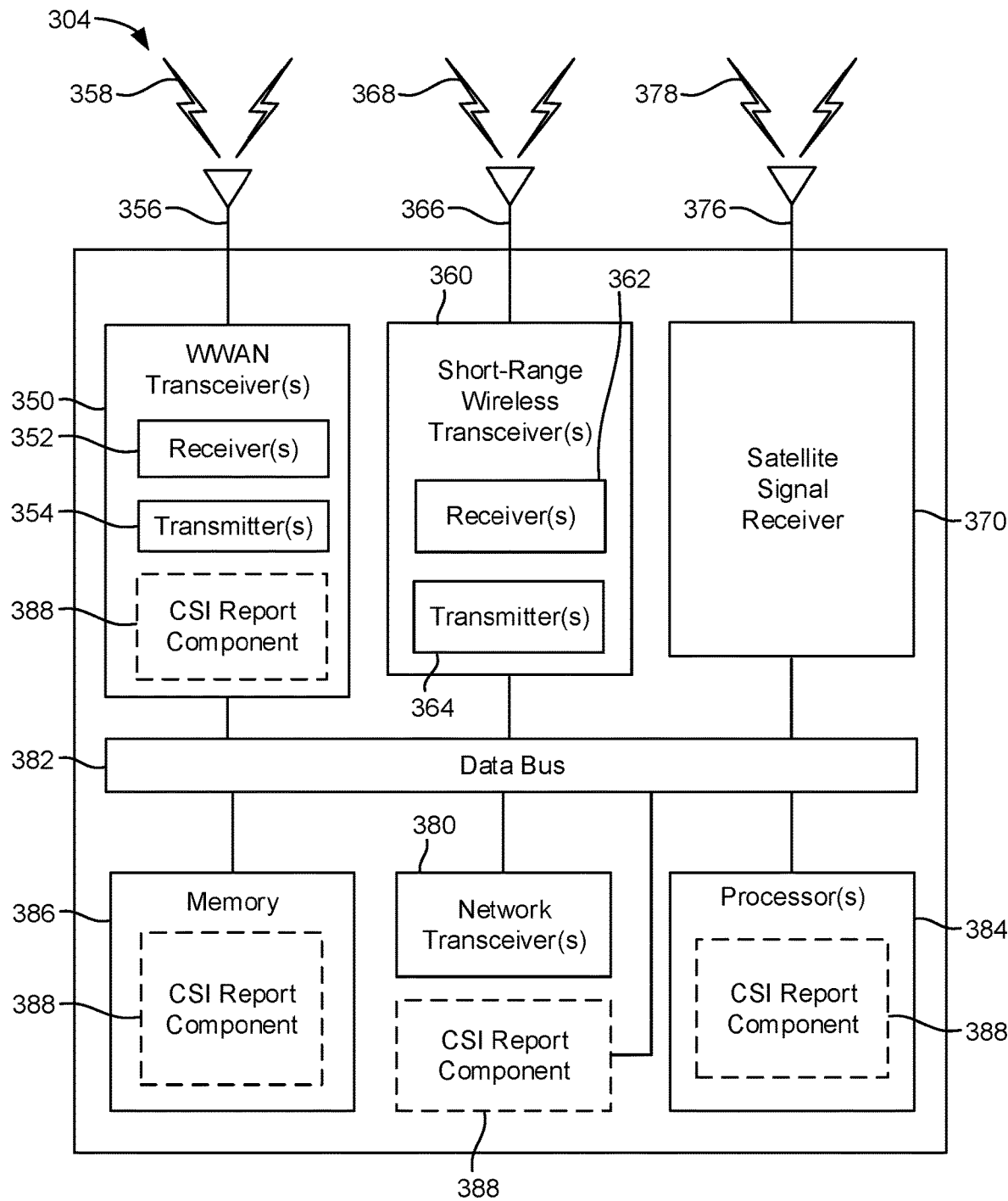
Figure 3C:
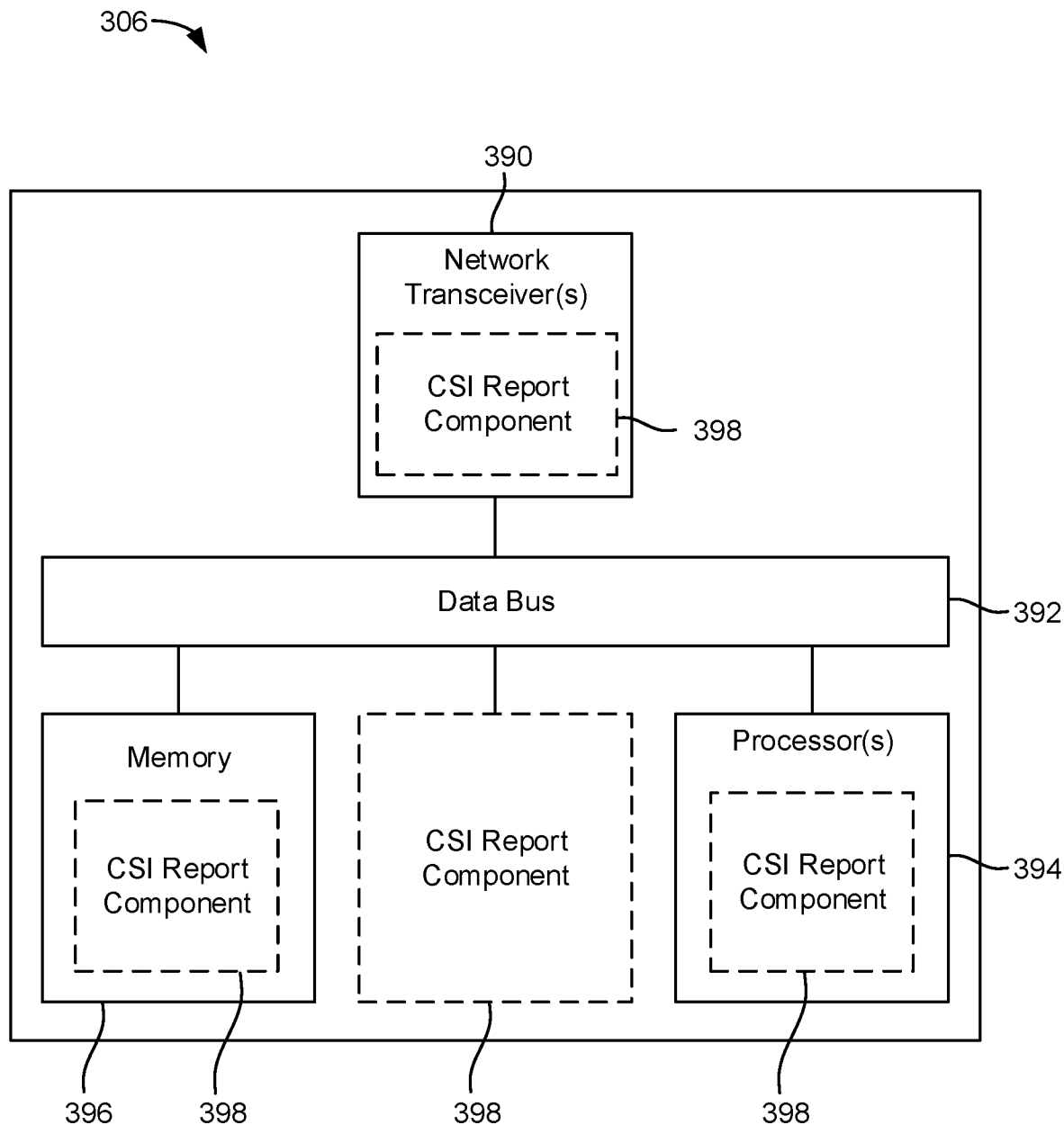

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include CSI report component 342, 388, and 398, respectively. The CSI report component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the CSI report component 342, 388, and 398 may be external to the processors 332, 384, and 394 (e.g., part of a modem processing system, integrated with another processing system, etc.). Alternatively, the CSI report component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the CSI report component 342, which may be, for example, part of the one or more WWAN transceivers 310, the memory 340, the one or more processors 332, or any combination thereof, or may be a standalone component. FIG. 3B illustrates possible locations of the CSI report component 388, which may be, for example, part of the one or more WWAN transceivers 350, the memory 386, the one or more processors 384, or any combination thereof, or may be a standalone component. FIG. 3C illustrates possible locations of the CSI report component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the CSI report component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
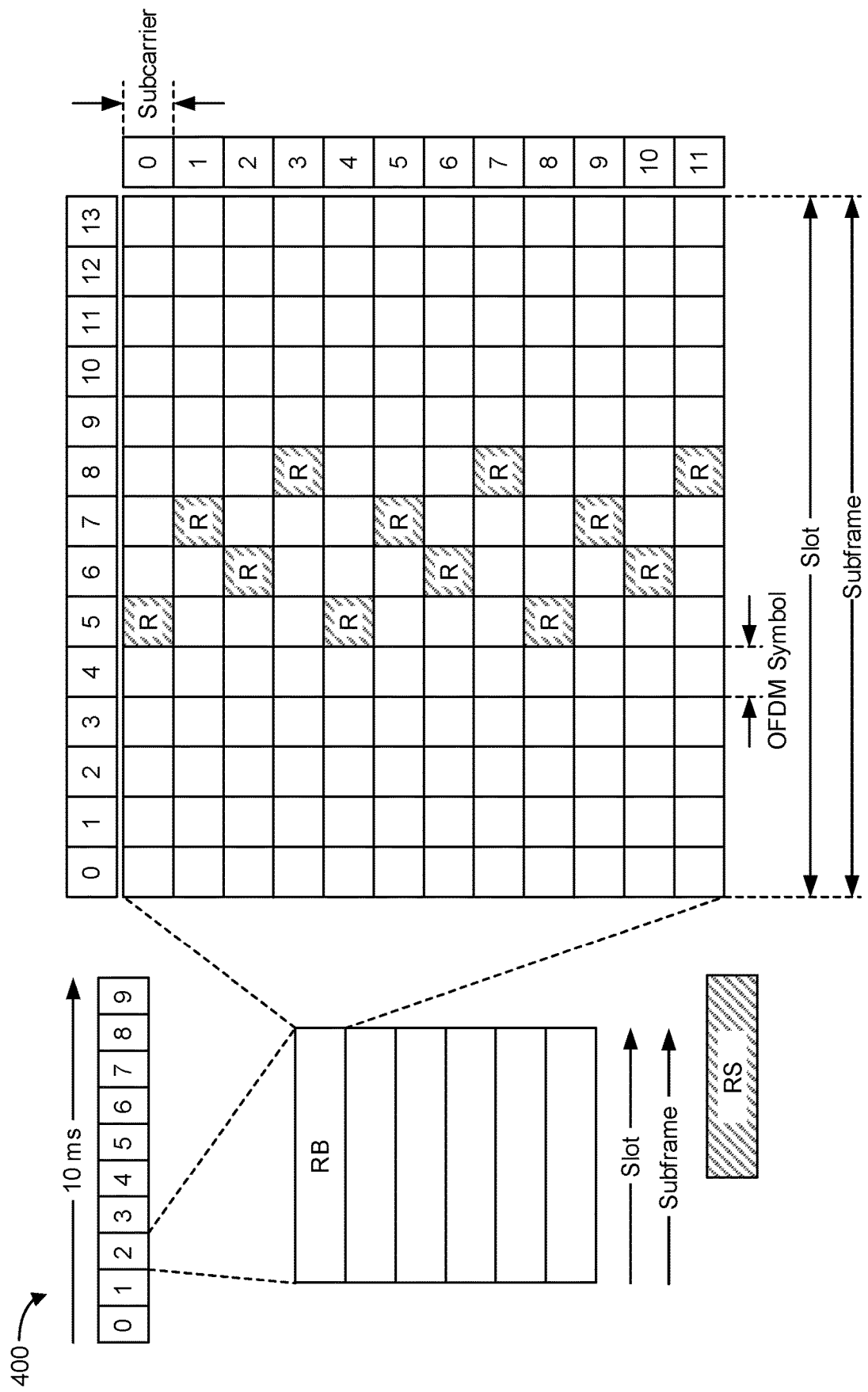
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
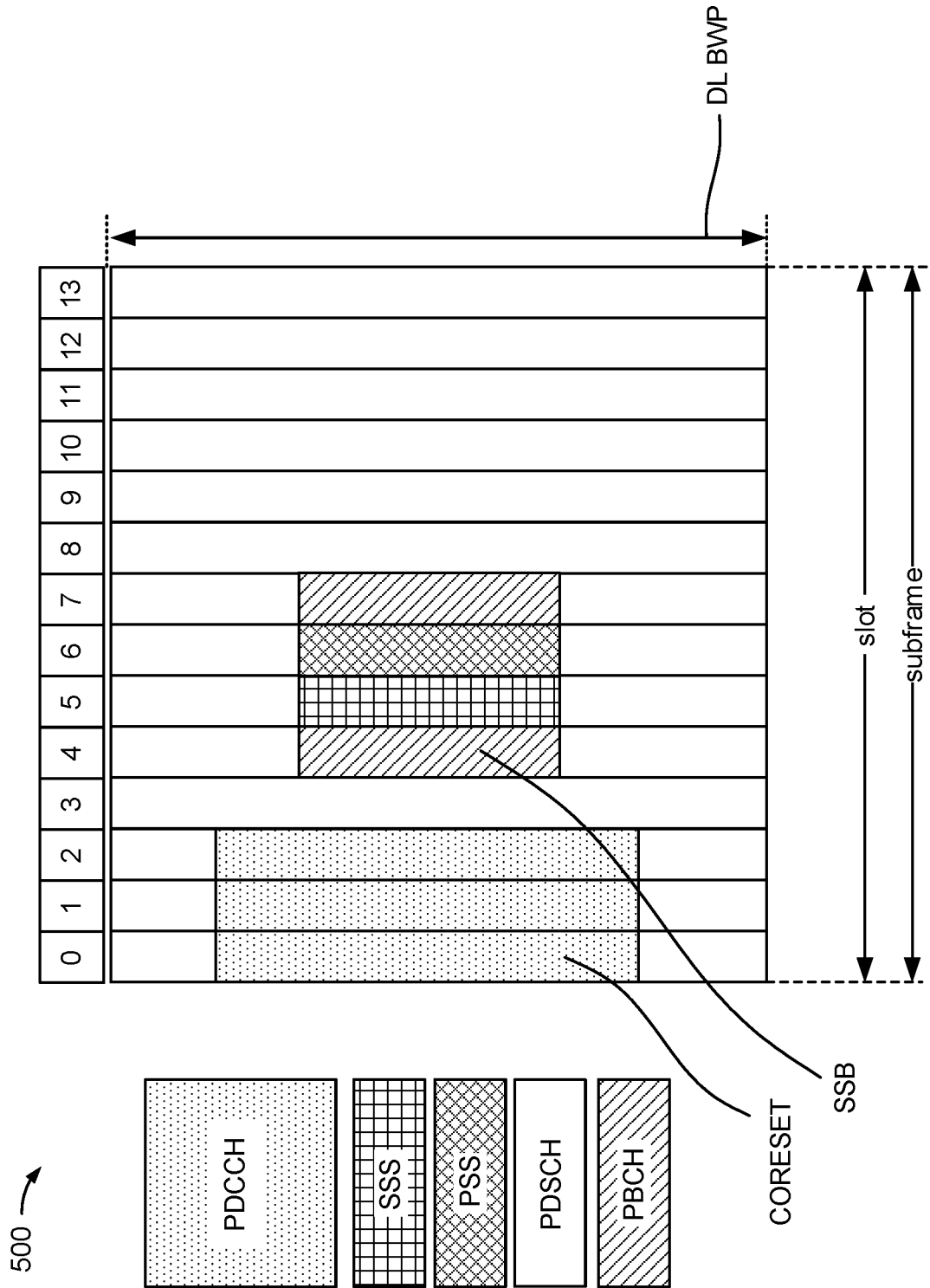
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
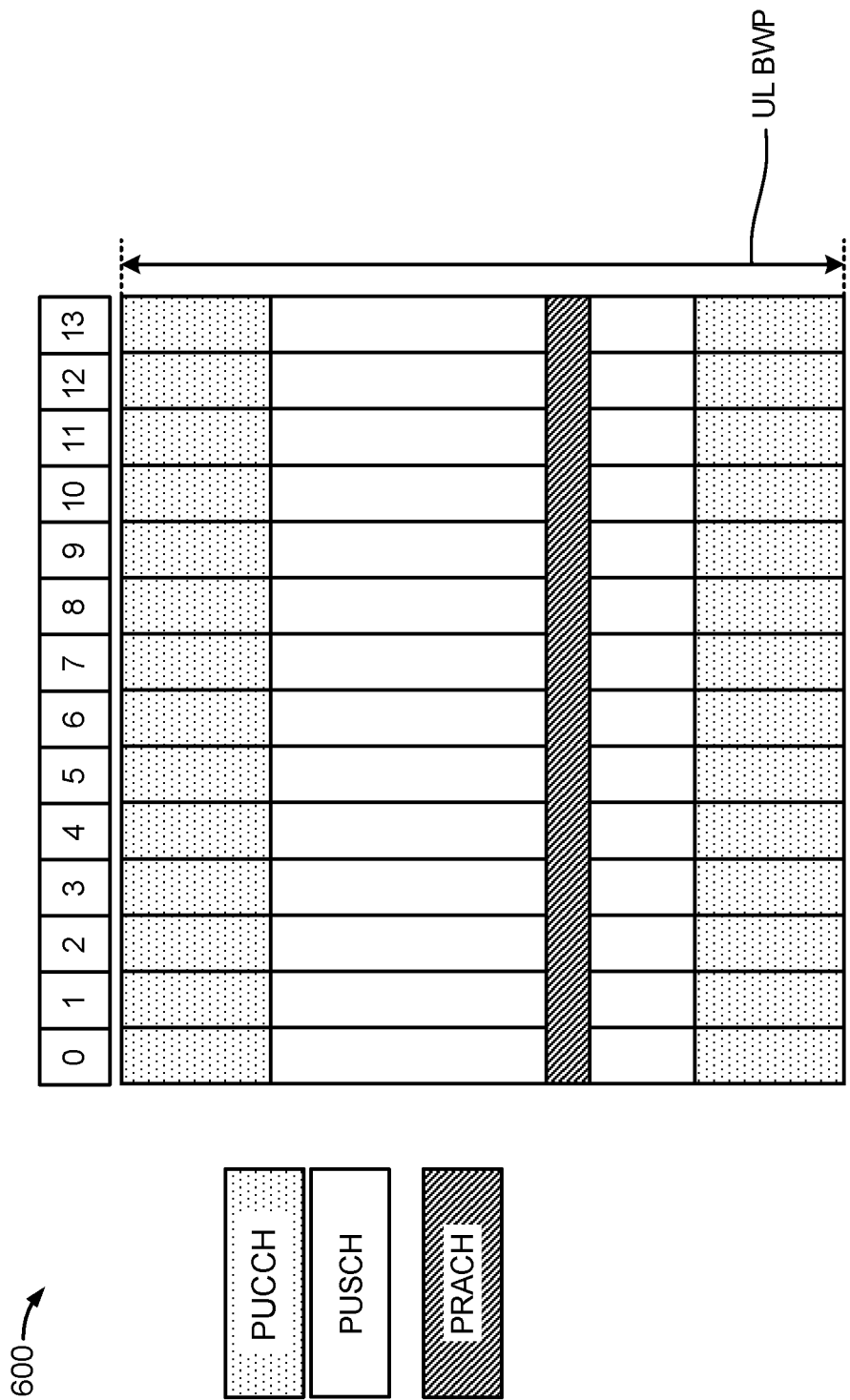
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 7:
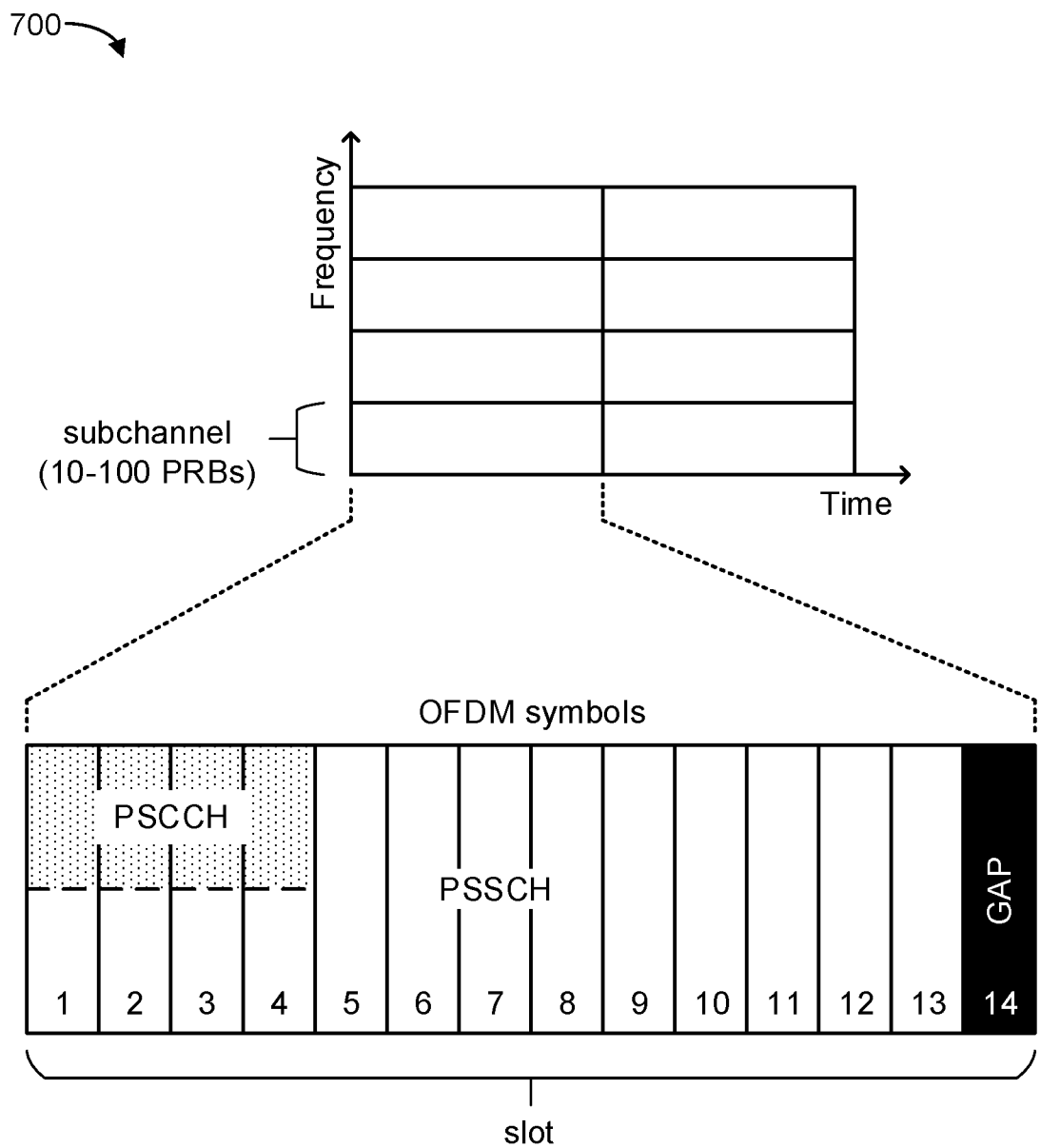
FIG. 7 illustrates time and frequency resources used for sidelink communication.

FIG. 7 illustrates time and frequency resources used for sidelink communication. A time-frequency grid 700 is divided into subchannels in the frequency domain and is divided into time slots in the time domain. Each subchannel comprises a number (e.g., 10, 15, 20, 25, 50, 75, or 100) of physical resource blocks (PRBs), and each slot contains a number (e.g., 14) of OFDM symbols. A sidelink communication can be (pre)configured to occupy fewer than 14 symbols in a slot. The first symbol of the slot is repeated on the preceding symbol for automatic gain control (AGC) settling. The example slot shown in FIG. 4 contains a physical sidelink control channel (PSCCH) portion and a physical sidelink shared channel (PSSCH) portion, with a gap symbol following the PSCCH. PSCCH and PSSCH are transmitted in the same slot.

Sidelink communications take place within transmission or reception resource pools. Sidelink communications occupy one slot and one or more subchannels. Some slots are not available for sidelink, and some slots contain feedback resources. Sidelink communication can be preconfigured (e.g., preloaded on a UE) or configured (e.g., by a base station via RRC).

Secure communications are very important in wireless communications systems. For example, IoT makes security more crucial since many devices will be connected to each other. Given the level of power of such devices, adding more security with additional secure bits obtained from channels and sounding signals between legit nodes may be beneficial. For example, such security may prohibit a potential eavesdropper UE from monitoring the respective communications. While current systems provide such security for certain L3 communications, security for physical (PHY) layer (or L1) (e.g., DCI, UCI, PUCCH, PSCCH, etc.) is not currently supported.

In some designs, a UE can maintain some key bits to secure its UL/SL transmissions, which may either be unsecured such as UCI carried in PUCCH or PSFCH in SL or SCI-1/2 in SL, or L3 secured such as data in PUSCH/PSSCH. In some cases, a UE can be asked to report CSI on PUCCH, e.g., multiple reports on one or more PUCCH resources. In such cases, it may be difficult to secure the CSI report via a secret key, given the limited bit availability for the secret key bits (e.g., new secret keys may be provided by gNB and/or between UEs at some time interval).

In some scenarios, two or more CSI report transmissions may "collide", in the sense that the two or more CSI report transmissions are scheduled to be transmitted simultaneously (for instance a periodic and an aperiodic). Also, a number of CSI reports scheduled to be transmitted simultaneously may result in too large payload size that cannot fit in the UCI container (for instance due to that HARQ-ACK and/or SR additionally needs to be multiplexed).

For these situations, some CSI reports may have to be dropped or omitted. To know which CSI reports to prioritize in this case, a number of prioritization rules may be defined. In some designs, CSI reports are first prioritized according to their time-domain behaviour and physical channel, where more dynamic reports are given precedence over less dynamic reports and PUSCH has precedence over PUCCH. That is, an aperiodic report has priority over a semi-persistent report on PUSCH, which in turn has priority over a semi-persistent report on PUCCH, which has priority over a periodic CSI report. In some designs, if multiple CSI reports with the same time-domain behaviour and physical channel collide, the reports are further prioritized depending on CSI content, where beam reports (i.e. L1-RSRP reporting) has priority over regular CSI reports. The rationale is that the CSI report is typically conditioned on a serving beam, so if the beam is not correct the CSI report is useless anyway.

In some designs, if there is still need for differentiation, the CSI reports are further prioritized based on serving cells associated with the respective CSI reports (in case of carrier aggregation (CA) operation). That is, CSI corresponding to the PCell has priority over CSI corresponding to SCells. Finally, in order to avoid any ambiguities in which CSI report is to be transmitted, the CSI reports may be prioritized based on the reportConfigID. In some designs, the above-noted priority rules are applied so that only a single CSI report is transmitted in case of CSI collision, with the exception of if multiple PUCCH-based CSI reports collide. In this case, it is possible to configure the UE with a larger "multi-CSI" PUCCH resource, where several CSI reports can be multiplexed in case of collision. In this case, as many CSI reports is possible without exceeding a maximum UCI code rate is transmitted in the "multi-CSI" PUCCH resource.

For PUSCH-based CSI reporting and Type II CSI reporting in particular, the CSI payload size can vary quite dramatically depending on the RI selection. For instance, for Type II reporting, the PMI payload for RI=2 is almost double to that of RI=1. Since the RI selection is not known by the gNB prior to scheduling an aperiodic CSI report on the PUSCH, the gNB has to allocate PUSCH resource (i.e., in frequency and time domain) by using a best guess of the RI selection the UE will make, perhaps by looking at historic RI reports. Thus, it is possible that the gNB has allocated PUSCH resources with the assumption that the UE will report RI=1, but the UE actually reports RI=2. In that case, it may be so that the CSI payload will not fit in the PUSCH container, i.e., the code rate will be too large or even the un-coded systematic bits will not fit.

Instead of dropping the entire CSI report in this case, which would be quite wasteful, some systems implement a partial CSI omission, where a portion of the CSI (which can provide some utility to the gNB and at least give information about the RI selection so that the gNB can allocate a proper PUSCH resource for the next aperiodic CSI request) can still be reported. This is accomplished by ordering the CSI content in CSI Part 2 in a particular fashion, as shown in FIG. 8.

Figure 8:
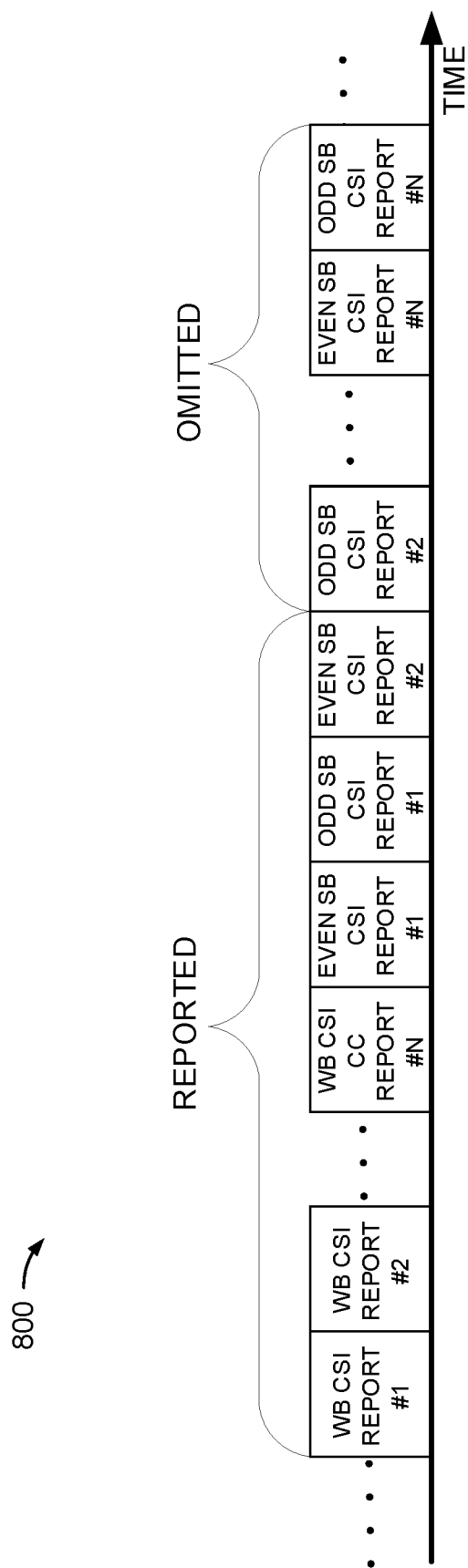
FIG. 8 illustrates a partial CSI omission scheme 800, in accordance with aspects of the disclosure.

FIG. 8 illustrates a partial CSI omission scheme 800, in accordance with aspects of the disclosure. In FIG. 8, multiple (N, where N>1) CSI reports are transmitted in the PUSCH. The wideband (WB) CSI components (i.e., the wideband PMI and CQI) for all the reports are mapped to the most significant bits of the UCI. Then, the subband CSI for each report are mapped according to the some priority rules, where the subband CSI for even numbered subbands are mapped first, followed by subband CSI for the odd numbered subbands. As shown in FIG. 8, if the resulting code rate of the UCI is above a threshold, a portion of the least significant UCI bits are omitted, until the code rate falls below the threshold. This means that subband CSI for odd numbered subbands for a report are omitted first. The rationale is that the gNB in this case would have subband PMI and CQI for ever other subband in the frequency domain and can therefore interpolate the PMI/CQI between two reported subbands to try to estimate the missing PMI/CQI values for the subband in the middle. While this will not result in perfect reconstruction, it is generally preferable to omitting CSI for an entire chunk of consecutive subbands.

Aspects of the disclosure are thereby directed to a CSI report field priority-based security scheme for a CSI report with multiple fields. Instead of omitting particular CSI reports as noted above, a UE may selectively secure higher priority CSI report fields while leaving other CSI report fields to conserve bits. Such aspects may provide various technical advantages, such as avoiding the need to drop entire CSI reports as in FIG. 8.

Figure 9:
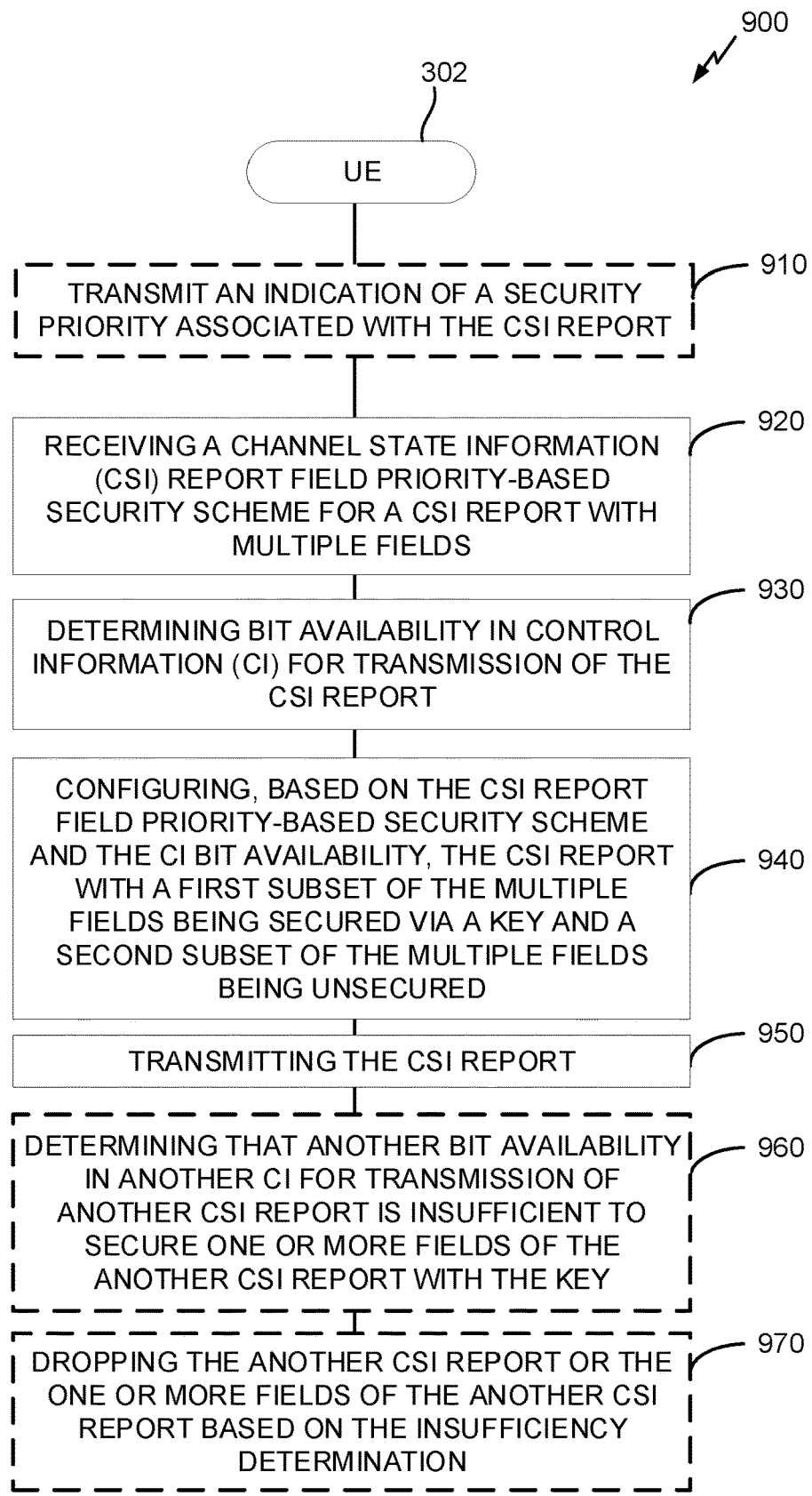
FIG. 9 illustrates an exemplary process of communications, according to aspects of the disclosure.

FIG. 9 illustrates an exemplary process 900 of wireless communication, according to aspects of the disclosure. In an aspect, the process 900 may be performed by UE 302.

Referring to FIG. 9, at 910, UE 302 (e.g., transmitter 314 or 324, etc.) optionally transmits an indication of a security priority associated with the CSI report. For example, UE 302 may determine security priority of a CSI report autonomously (e.g., by some higher layer application, implicitly through a security QoS indication from higher layer), etc., and may inform the serving gNB of such prioritization. The serving gNB may then determine a CSI report field priority-based security scheme based on the indicated security priority, and provide the CSI report field priority-based security scheme to UE 302. In an example, UE 302 may receive a security QoS or security priority indication associated with a CSI report index, or a CSI report associated with a BWP-ID/CC-ID. In an aspect, UE 302 may use these configured priority indications to prioritize the security of CSI reports in decreasing security priority index, or the CSI reports derived on a BWP or CC in decreasing security priority index. This QoS or security priority indication can be used to determine the security priority that is optionally transmitted by UE 302 to BS 304 (e.g., serving gNB) at 910.

Referring to FIG. 9, at 920, UE 302 (e.g., receiver 312 or 322, etc.) receives a CSI report field priority-based security scheme for a CSI report with multiple fields. In some designs, the CSI report field priority-based security scheme for the CSI report may be received from a serving gNB. In some designs, the CSI report field priority-based security scheme is configured by the serving gNB based upon information sent to the serving gNB by UE 302, such as the optional indication of the security priority at 910. In an aspect, the indication of the CSI report field prioritization scheme may be received via RRC signaling.

Referring to FIG. 9, at 930, UE 302 (e.g., processor(s) 332, CSI report component 342, etc.) determines bit availability in control information (CI) for transmission of the CSI report. For example, as noted above, the CSI payload may not fit a respective container (or payload) in some cases. Hence, the bit availability in CI may be limited, in which case a secret key may be applied in a selectively rather than indiscriminately to all CSI fields. In some designs, the CI may correspond to UCI in PUCCH, or SCI in PSCCH.

Referring to FIG. 9, at 940, UE 302 (e.g., processor(s) 332, CSI report component 342, etc.) configures, based on the CSI report field priority-based security scheme and the CI bit availability, the CSI report with a first subset of the multiple fields being secured via a key and a second subset of the multiple fields being unsecured. In some designs, higher priority CSI fields are secured via the key, while lower priority CSI fields are left unsecured. In some designs, the key may be the only available key for securing the CSI report fields. In other designs, the key may be one of a plurality of keys for securing the CSI report fields (e.g., different keys may have varying strengths, with stronger keys generally requiring more bits than weaker keys). More detailed examples of the CSI report field priority-based security scheme are described below.

Referring to FIG. 9, at 950, UE 302 (e.g., transmitter 314 or 324, etc.) transmits the CSI report (e.g., to the serving gNB or to another UE via sidelink). As noted above, an eavesdropping device may attempt to intercept the CSI report. In this case, the eavesdropping device may be able to decode the unsecured second subset of CSI fields, but the eavesdropping device would generally not be able to decode the secured first subset of CSI fields. Note that, as used herein, an "unsecured" field may correspond to a field that is either not secured by a key at all or is secured by a weak key below some strength threshold (with the key used to secure the one or more fields being above this strength threshold). Hence, a reasonable level of security may be achieved while also conserving bit utilization by skipping the securing of lower priority CSI fields.

Referring to FIG. 9, at 960, UE 302 (e.g., processor(s) 332, CSI report component 342, etc.) optionally determines that another bit availability in another CI for transmission of another CSI report is insufficient to secure one or more fields of the another CSI report with the key. For example, as noted above, a number of CSI reports scheduled to be transmitted simultaneously may result in too large payload size that cannot fit in the UCI container (for instance due to that HARQ-ACK and/or SR additionally needs to be multiplexed). For example, the one or more fields may include one or more higher priority fields for which higher security is desired. In some designs, the one or more fields may include precoding matrix indicator (PMI) field, or a rank indicator (RI) field, or an L1 reference signal received power (RSRP) field, or a channel quality indicator (CQI) field, or any combination thereof.

Referring to FIG. 9, at 970, UE 302 (e.g., processor(s) 332, CSI report component 342, etc.) optionally drops the another CSI report or the one or more fields of the another CSI report based on the insufficiency determination. In some designs, fields such as PMI, RI, L1 RSRP and/or CQI may be dropped in a scenario where the respective fields cannot be secured with the key to eliminate a risk that such fields will be intercepted by a rogue device. In some designs, the CSI report itself may be dropped in a scenario where the CSI report is associated with a low priority (e.g., a periodic CSI) and the bit availability for securing the one or more fields with the key is insufficient. In some designs, the serving gNB may instruct UE 302 with respect to rule(s) that control when a CSI report (or fields within CSI report) can be dropped. In a specific example, since the PMI could give indication of location or relative movement of a UE, if the report is of low priority (such as periodic CSI), then the UE can drop the report if there is no secure key or if there is no strong key.

Figure 10:
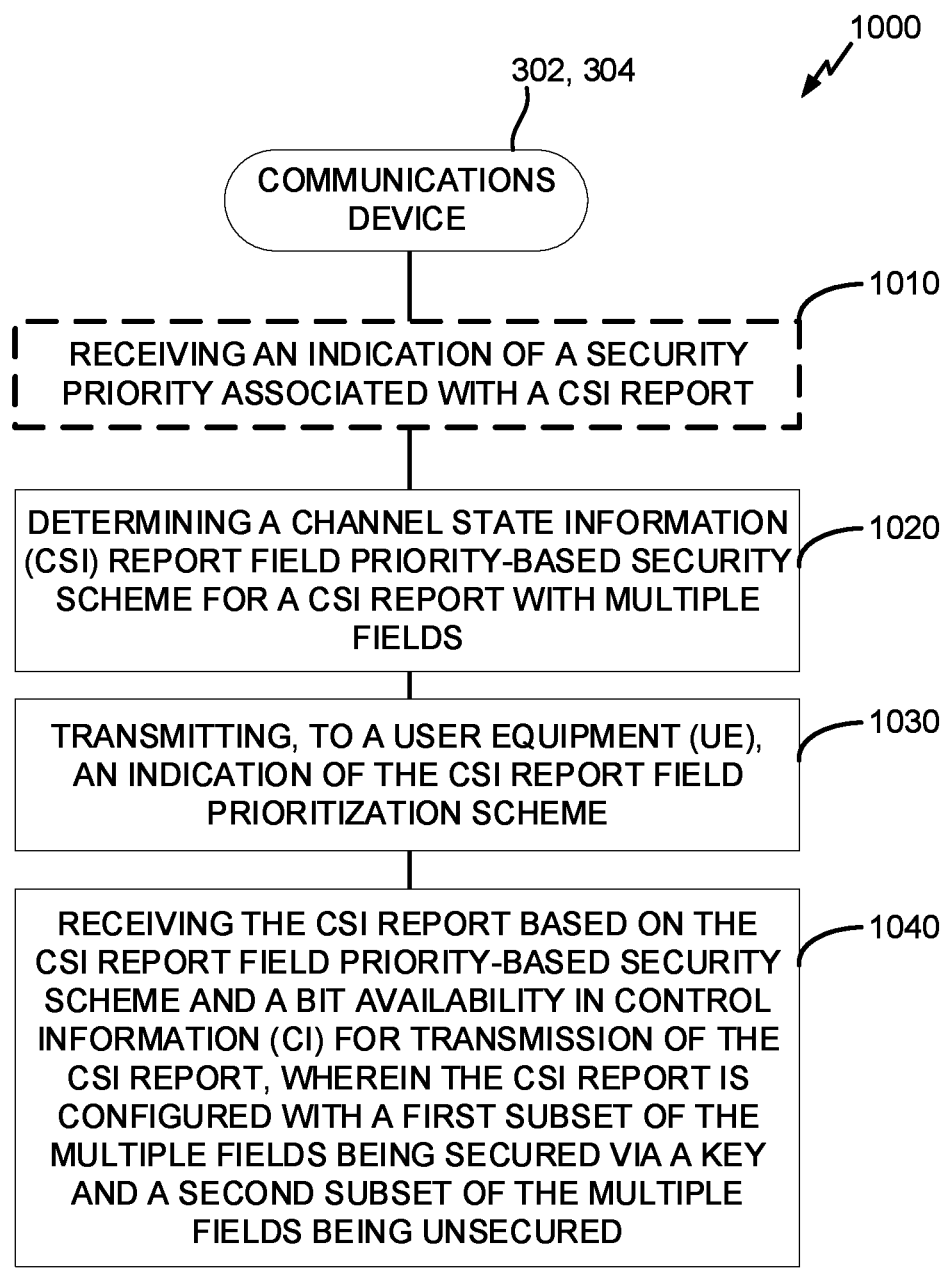
FIG. 10 illustrates an exemplary process of communications, according to aspects of the disclosure.

FIG. 10 illustrates an exemplary process 1000 of wireless communication, according to aspects of the disclosure. In an aspect, the process 1000 may be performed by a communications device, such as a serving gNB (e.g., BS 304) or a UE such as UE 302.

Referring to FIG. 10, at 1010, the communications device (e.g., receiver 312 or 322 or 352 or 362, etc.) optionally receives an indication of a security priority associated with a CSI report (e.g., from a UE, such as the UE performing the process of FIG. 9). For example, a UE may determine security priority of a CSI report autonomously (e.g., by some higher layer application, implicitly through a security QoS indication from higher layer), etc., and may inform the serving gNB of such prioritization. The serving gNB may then determine a CSI report field priority-based security scheme based on the indicated security priority, and provide the CSI report field priority-based security scheme to the UE.

Referring to FIG. 10, at 1020, the communications device (e.g., processor(s) 332 or 384, CSI report component 342 or 388, etc.) determines channel state information (CSI) report field priority-based security scheme for a CSI report with multiple fields. In some designs, the CSI report field priority-based security scheme is configured by the communications device (e.g., serving gNB or another UE) based upon information sent to the communications device by the UE, such as the optional indication of the security priority at 1010.

Referring to FIG. 10, at 1030, the communications device (e.g., transmitter 314 or 324 or 354 or 364, etc.) transmits, to a UE, an indication of the CSI report field prioritization scheme. In an aspect, the indication of the CSI report field prioritization scheme may be transmitted via RRC signaling.

Referring to FIG. 10, at 1040, the communications device (e.g., receiver 312 or 322 or 352 or 362, etc.) receives the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured. In some designs, the key may be the only available key for securing the CSI report fields. In other designs, the key may be one of a plurality of keys for securing the CSI report fields (e.g., different keys may have varying strengths, with stronger keys generally requiring more bits than weaker keys). In some designs, higher priority CSI fields are secured via the key, while lower priority CSI fields are left unsecured (or secured by a weaker key). More detailed examples of the CSI report field priority-based security scheme are described below. As noted above, an eavesdropping device may attempt to intercept the CSI report. In this case, the eavesdropping device may be able to decode the unsecured second subset of CSI fields, but the eavesdropping device would generally not be able to decode the secured first subset of CSI fields. Hence, a reasonable level of security may be achieved while also conserving bit utilization by skipping the securing of lower priority CSI fields.

Referring to FIGS. 9-10, in some designs, the CI corresponds to UCI of PUCCH (e.g., for Uu communication between UE and gNB). In other designs, the CI corresponds to UCI of PUSCH (e.g., for Uu communication between UE and gNB). For example, even though PUSCH is secured by L3 in some designs, the PUSCH may further be secured at L1 or PHY layer using secret key(s) such that if CSI is sent on PUSCH, aspects of the disclosure may still be applied thereto. In other designs, the CI corresponds to sidelink CI (SCI) of physical sidelink control channel (PSCCH) or physical sidelink feedback channel (PSFCH). In this case, the CSI report field priority-based security scheme is configured by the UE or another UE, or the CSI report field priority-based security scheme is configured by a serving base station of the UE (e.g., serving gNB may set the CSI report field priority-based security scheme for the sidelink communication). In other designs, the CI corresponds to a medium access control (MAC) command element (CE). For example, MAC-CE may be used in some designs to send CSI reports. MAC-CE may optionally be secured at L2 layer. However, similar to the L3 PUSCH noted above, even though MAC-CE is secured by L2 in some designs, the MAC-CE may further be secured at L1 or PHY layer using secret key(s) such that if CSI is sent on MAC-CE, aspects of the disclosure may still be applied thereto.

Referring to FIGS. 9-10, in some designs, the multiple fields of the CSI report may include comprise:
  a precoding matrix indicator (PMI) field, or
  an L1 reference signal received power (RSRP) field, or
  a wideband (WB) channel quality indicator (CQI) field, or
  a subband (SB) CQI field, or
  a wideband (WB) rank indicator (RI) field, or
  an SB RI field, or
  a CSI reference signal (CSI-RS) resource indicator (CRI) field, or
  a strongest layer indicator (SLI) field, or
  any combination thereof.

Referring to FIGS. 9-10, in some designs, the CSI report field priority-based security scheme allocates the multiple fields to the first subset in order of field priority until a size of the CSI report exceeds the bit availability.

Referring to FIGS. 9-10, in some designs:
  the CSI report field priority-based security scheme allocates a first priority to the PMI field and the L1 RSRP field (e.g., PMI/L1-RSRP may be given the highest priority of security and, if there are two type of keys, PMI/L1-RSRP may be secured by the strongest key. The PMI can give an attacker the movement or the location of a UE, relative to the fixed location of gNB (which is easily known at attackers)), and
  the CSI report field priority-based security scheme allocates a second priority that is lower than the first priority to the WB CQI field and the WB RI field (e.g., WB CQI and WB RI should be the second highest priority after PMI and L1 RSRP since these fields provide a good indication of a strength of the legitimate channel, and for example, if the eavesdropper allocates antennas or antenna panels based on how good the legitimate channel is, then securing this information is important. For example, an attacker can allocate X number of antennas when RI is 2 while it can allocate Y>X if RI is 4), and wherein the CSI report field priority-based security scheme allocates a third priority that is lower than the second priority to the SB CQI field and the SB RI field (e.g., SB CQI may be at the third highest priority tier since SB SQI indicates how much processing (or good or bad) is needed for sub-band, etc.), and wherein the CSI report field priority-based security scheme allocates a fourth priority (e.g., a lowest priority among the various CSI report fields) that is lower than the third priority to the CRI field and the SLI field.

Referring to FIGS. 9-10, in some designs, the CSI report field priority-based security scheme is based upon a security quality of service (QoS), or the CSI report field priority-based security scheme is based upon a security priority indication, or the CSI report field priority-based security scheme is based upon a CSI report index, or the CSI report field priority-based security scheme is based upon a bandwidth part (BWP) identifier or component carrier (CC) identifier, or any combination thereof Referring to FIGS. 9-10, in some designs, the CI corresponds to sidelink CI (SCI) of physical sidelink control channel (PSCCH) or physical sidelink feedback channel (PSFCH). In some designs, the CSI report field priority-based security scheme is configured by the UE or another UE (e.g., via sidelink or Mode 2 operation), or the CSI report field priority-based security scheme is configured by a serving base station of the UE (e.g., for managed sidelink or Mode 1 operation). In case of sidelink, CSI reports and/or CSI fields related to UE-to-UE channels can have different security level prioritization as compared to UE-to-gNB or Uu channels. In some designs, CSI report field priority-based security schemes in sidelink may have different security prioritization, or different CSI report IDs, CSI associated with different resource pool IDs, and so on. In some designs as noted above, a UE can configure the security level prioritization to another UE (e.g., Mode 2), or gNB may configure the security level prioritization for a UE-to-UE communication (e.g., Mode 1). In some designs, the CI corresponds to a medium access control (MAC) command element (CE).

Figure 11:
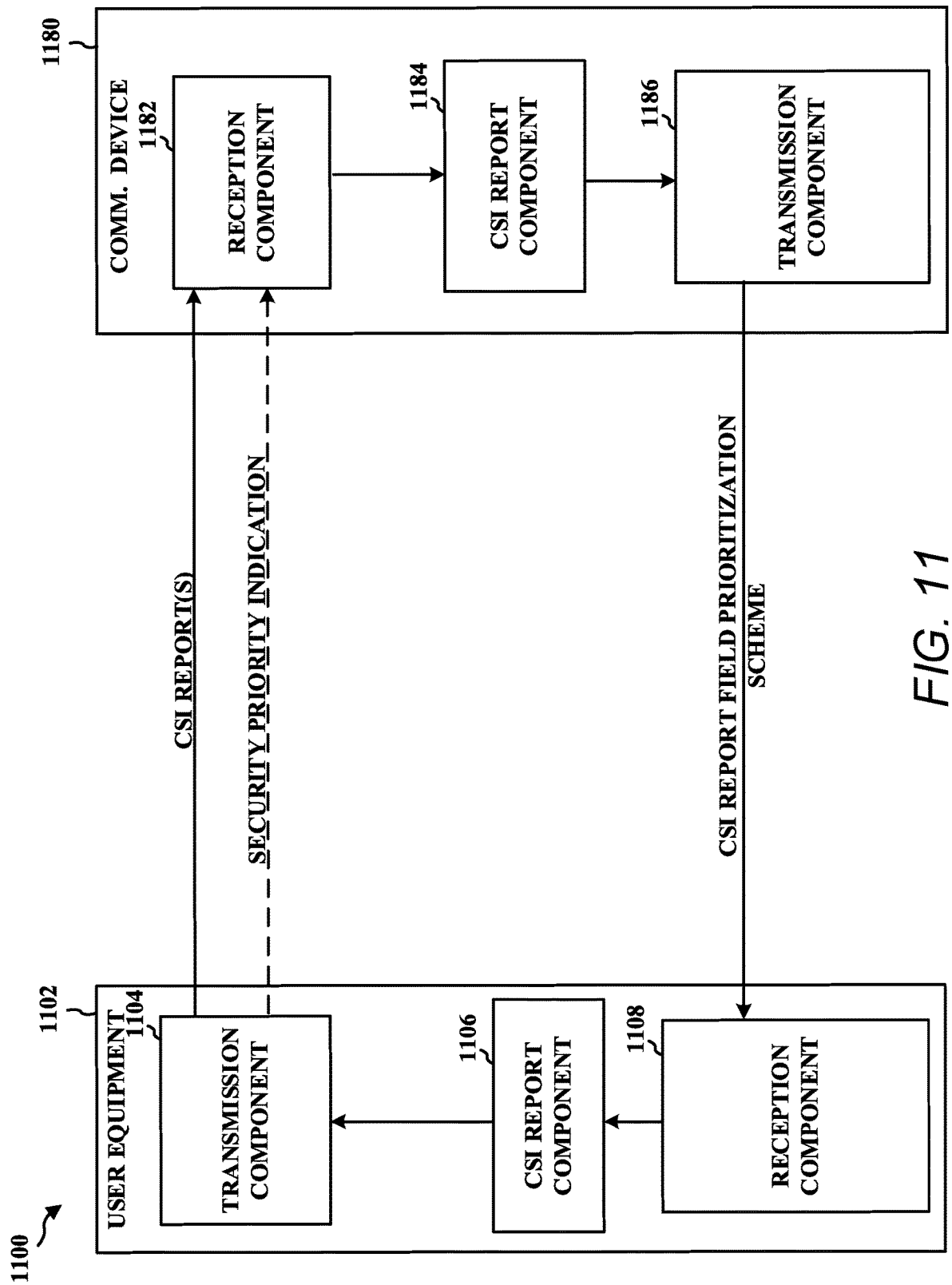
FIG. 11 is a conceptual data flow diagram illustrating the data flow between different means/components in exemplary apparatuses in accordance with an aspect of the disclosure.

FIG. 11 is a conceptual data flow diagram 1100 illustrating the data flow between different means/components in exemplary apparatuses 1102 and 1180 in accordance with an aspect of the disclosure. The apparatus 1102 may be a UE (e.g., UE 302, etc.) in communication with an apparatus 1180, which may be a communications device (e.g., UE 302 or BS 304, etc.).

The apparatus 1102 includes a transmission component 1104, which may correspond to transmitter circuitry in UE 302 as depicted in FIG. 3A, including transmitter(s) 314 or 324, antenna(s) 316 or 326, etc. The apparatus 1102 further includes CSI report component 1106, which may correspond to processor circuitry in UE 302 as depicted in FIG. 3A, including processing system 332, etc. The apparatus 1102 further includes a reception component 1108, which may correspond to receiver circuitry in UE 302 as depicted in FIG. 3A, including receiver(s) 312 or 322, antenna(s) 316 or 326, etc.

The apparatus 1180 includes a transmission component 1186, which may correspond to transmitter circuitry in UE 302 or BS 304 as depicted in FIGS. 3A-3B, including transmitter(s) 314 or 324 or 354 or 364, antenna(s) 316 or 326 or 356 or 366, etc. The apparatus 1180 further includes CSI report component 1184, which may correspond to processor circuitry in UE 302 or BS 304, as depicted in FIGS. 3A-3B, including processing system 332 or 384, etc. The apparatus 1180 further includes a reception component 1182, which may correspond to receiver circuitry in UE 302 or BS 304 as depicted in FIGS. 3A-3B, including receiver(s) 312 or 322 or 352 or 362, antenna(s) 316 or 326 or 356 or 366, etc.

Referring to FIG. 11, the CSI report component 1106 optionally directs transmission component 1104 to transmit a security priority indication to reception component 1182. The CSI report component 1184 optionally uses the optional security priority indication to determine a CSI report field prioritization scheme for the UE 1102. The CSI report component 1184 directs the transmission component 1186 to transmit the CSI report field prioritization scheme to the reception component 1108. The CSI report component 1106 directs the transmission component 1104 to transmit CSI report(s) in accordance with the CSI report field prioritization scheme.

One or more components of the apparatus 1102 and apparatus 1180 may perform each of the blocks of the algorithm in the aforementioned flowcharts of FIGS. 9-10. As such, each block in the aforementioned flowcharts of FIGS. 9-10 may be performed by a component and the apparatus 1102 and apparatus 1180 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
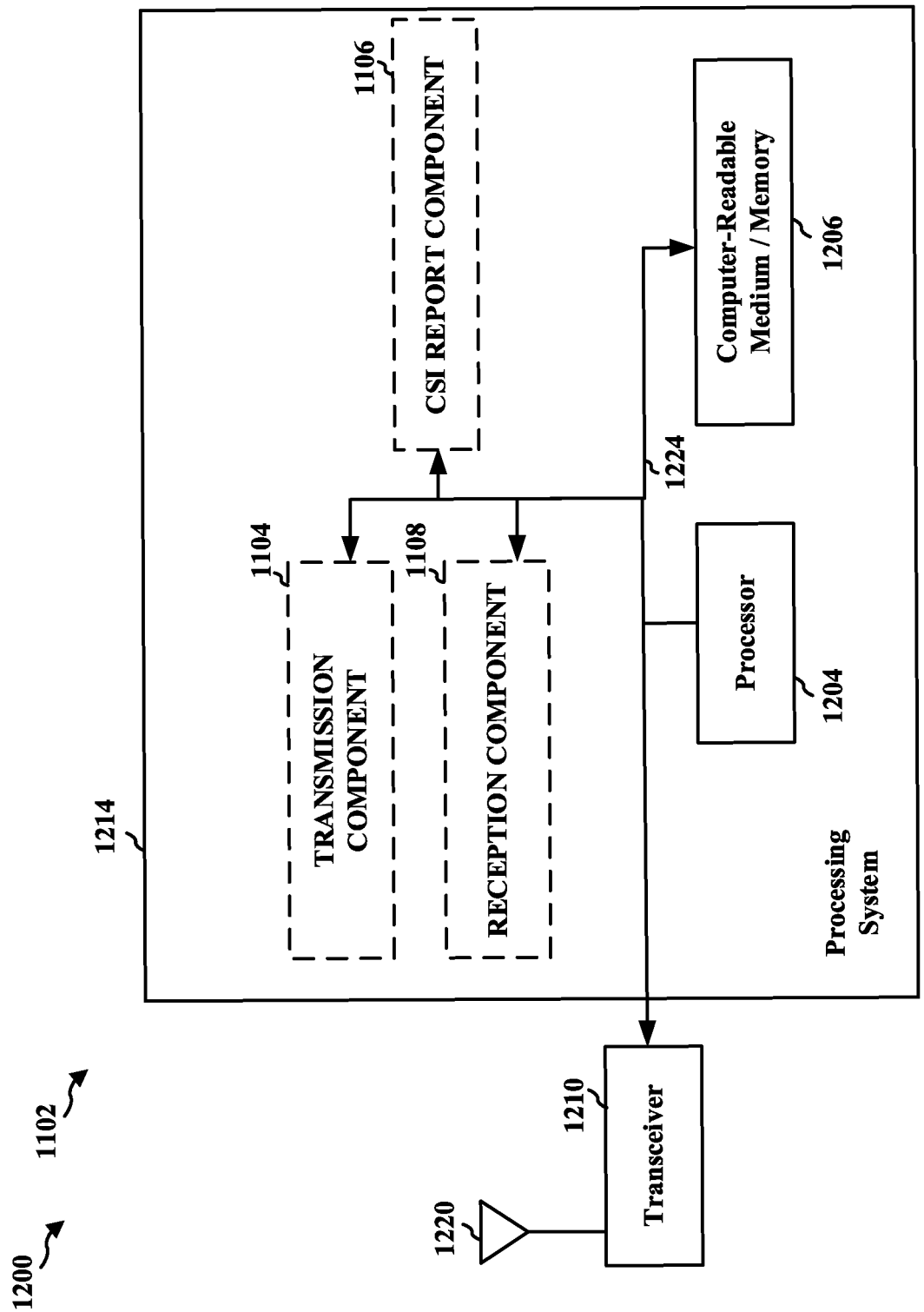
FIGS. 12-13 are diagrams illustrating examples of hardware implementations for apparatuses employing processing systems.

FIG. 12 is a diagram 1200 illustrating an example of a hardware implementation for an apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106 and 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1108. In addition, the transceiver 1210 receives information from the processing system 1214, specifically the transmission component 1104, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106 and 1108. The components may be software components running in the processor 1204, resident/stored in the computer readable medium/memory 1206, one or more hardware components coupled to the processor 1204, or some combination thereof.

In one configuration, the apparatus 1102 includes means for receiving a channel state information (CSI) report field priority-based security scheme for a CSI report with multiple fields, means for determining bit availability in control information (CI) for transmission of the CSI report, means for configuring, based on the CSI report field priority-based security scheme and the CI bit availability, the CSI report with a first subset of the multiple fields being secured via a key and a second subset of the multiple fields being unsecured, and means for transmitting the CSI report.

The aforementioned means may be one or more of the aforementioned components of the apparatus 1102 and/or the processing system 1214 of the apparatus 1102 configured to perform the functions recited by the aforementioned means.

Figure 13:
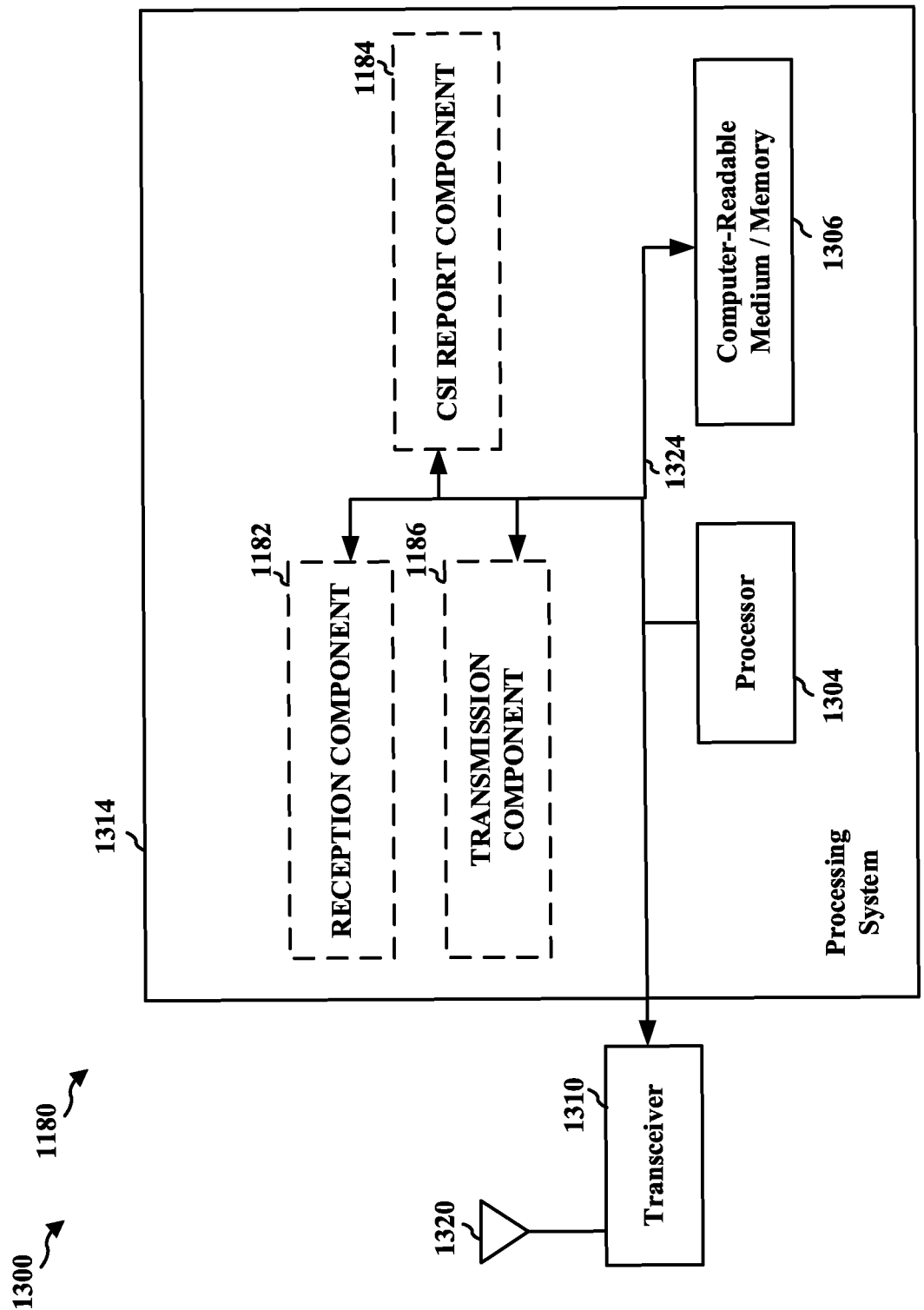

FIG. 13 is a diagram 1300 illustrating an example of a hardware implementation for an apparatus 1180 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1182, 1184 and 1186, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1182. In addition, the transceiver 1310 receives information from the processing system 1314, specifically the transmission component 1186, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1182, 1184 and 1186. The components may be software components running in the processor 1304, resident/stored in the computer readable medium/memory 1306, one or more hardware components coupled to the processor 1304, or some combination thereof.

In one configuration, the apparatus 1180 may include means for determining a channel state information (CSI) report field priority-based security scheme for a CSI report with multiple fields, means for transmitting, to a user equipment (UE), an indication of the CSI report field prioritization scheme, and means for receiving the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

The aforementioned means may be one or more of the aforementioned components of the apparatus 1180 and/or the processing system 1314 of the apparatus 1180 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: receiving a channel state information (CSI) report field priority-based security scheme for a CSI report with multiple fields; determining bit availability in control information (CI) for transmission of the CSI report; configuring, based on the CSI report field priority-based security scheme and the CI bit availability, the CSI report with a first subset of the multiple fields being secured via a key and a second subset of the multiple fields being unsecured; and transmitting the CSI report.

Clause 2. The method of clause 1, wherein the CI corresponds to uplink CI (UCI) of physical uplink control channel (PUCCH) or physical uplink shared channel (PUSCH).

Clause 3. The method of any of clauses 1 to 2, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 4. The method of clause 3, wherein the CSI report field priority-based security scheme allocates the multiple fields to the first subset in order of field priority until a size of the CSI report exceeds the bit availability.

Clause 5. The method of any of clauses 3 to 4, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 6. The method of any of clauses 1 to 5, further comprising: determining that another bit availability in another CI for transmission of another CSI report is insufficient to secure one or more fields of the another CSI report with the key; and dropping the another CSI report or the one or more fields of the another CSI report based on the insufficiency determination.

Clause 7. The method of clause 6, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 8. The method of any of clauses 1 to 7, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 9. The method of any of clauses 1 to 8, further comprising: transmitting an indication of a security priority associated with the CSI report, wherein the CSI report field priority-based security scheme is received in response to the transmitted indication of the security priority associated with the CSI report.

Clause 10. The method of any of clauses 1 to 9, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 11. The method of clause 10, wherein the CSI report field priority-based security scheme is configured by the UE or another UE, or wherein the CSI report field priority-based security scheme is configured by a serving base station of the UE.

Clause 12. A method of operating a communications device, comprising: determining a channel state information (CSI) report field priority-based security scheme for a CSI report with multiple fields; transmitting, to a user equipment (UE), an indication of the CSI report field prioritization scheme; and receiving the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

Clause 13. The method of clause 12, wherein the communications device corresponds to a serving base station of the UE, or wherein the communications device corresponds to another UE.

Clause 14. The method of any of clauses 12 to 13, wherein the CI corresponds to uplink CI (UCI) of physical uplink control channel (PUCCH) or physical uplink shared channel (PUSCH).

Clause 15. The method of any of clauses 12 to 14, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 16. The method of clause 15, wherein the CSI report field priority-based security scheme allocates the multiple fields to the first subset in order of field priority until a size of the CSI report exceeds the bit availability.

Clause 17. The method of any of clauses 15 to 16, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 18. The method of any of clauses 12 to 17, wherein the CSI report field priority-based security scheme instructs the UE to drop another CSI report or one or more fields of the another CSI report if another bit availability in another CI for transmission of the another CSI report is insufficient to secure the one or more fields of the another CSI report with the key.

Clause 19. The method of clause 18, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 20. The method of any of clauses 12 to 19, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 21. The method of any of clauses 12 to 20, further comprising: receiving an indication of a security priority associated with the CSI report, wherein the CSI report field priority-based security scheme is transmitted in response to the transmitted indication of the security priority associated with the CSI report.

Clause 22. The method of any of clauses 12 to 21, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 23. A user equipment (UE), comprising: a memory; at least one transceiver; and at least one processor communicatively coupled to the memory and the at least one transceiver, the at least one processor configured to: receive, via the at least one transceiver, a channel state information (CSI) report field priority-based security scheme for a CSI report with multiple fields; determine bit availability in control information (CI) for transmission of the CSI report; configure, based on the CSI report field priority-based security scheme and the CI bit availability, the CSI report with a first subset of the multiple fields being secured via a key and a second subset of the multiple fields being unsecured; and transmit, via the at least one transceiver, the CSI report.

Clause 24. The UE of clause 23, wherein the CI corresponds to uplink CI (UCI) of physical uplink control channel (PUCCH) or physical uplink shared channel (PUSCH).

Clause 25. The UE of any of clauses 23 to 24, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 26. The UE of clause 25, wherein the CSI report field priority-based security scheme allocates the multiple fields to the first subset in order of field priority until a size of the CSI report exceeds the bit availability.

Clause 27. The UE of any of clauses 25 to 26, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 28. The UE of any of clauses 23 to 27, wherein the at least one processor is further configured to: determine that another bit availability in another CI for transmission of another CSI report is insufficient to secure one or more fields of the another CSI report with the key; and drop the another CSI report or the one or more fields of the another CSI report based on the insufficiency determination.

Clause 29. The UE of clause 28, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 30. The UE of any of clauses 23 to 29, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 31. The UE of any of clauses 23 to 30, wherein the at least one processor is further configured to: transmit, via the at least one transceiver, an indication of a security priority associated with the CSI report, wherein the CSI report field priority-based security scheme is received in response to the transmitted indication of the security priority associated with the CSI report.

Clause 32. The UE of any of clauses 23 to 31, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 33. The UE of clause 32, wherein the CSI report field priority-based security scheme is configured by the UE or another UE, or wherein the CSI report field priority-based security scheme is configured by a serving base station of the UE.

Clause 34. A communications device, comprising: a memory; at least one transceiver; and at least one processor communicatively coupled to the memory and the at least one transceiver, the at least one processor configured to: determine a channel state information (CSI) report field priority-based security scheme for a CSI report with multiple fields; transmit, via the at least one transceiver, to a user equipment (UE), an indication of the CSI report field prioritization scheme; and receive, via the at least one transceiver, the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

Clause 35. The communications device of clause 34, wherein the communications device corresponds to a serving base station of the UE, or wherein the communications device corresponds to another UE.

Clause 36. The communications device of any of clauses 34 to 35, wherein the CI corresponds to uplink CI (UCI) of physical uplink control channel (PUCCH) or physical uplink shared channel (PUSCH).

Clause 37. The communications device of any of clauses 34 to 36, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 38. The communications device of clause 37, wherein the CSI report field priority-based security scheme allocates the multiple fields to the first subset in order of field priority until a size of the CSI report exceeds the bit availability.

Clause 39. The communications device of any of clauses 37 to 38, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 40. The communications device of any of clauses 34 to 39, wherein the CSI report field priority-based security scheme instructs the UE to drop another CSI report or one or more fields of the another CSI report if another bit availability in another CI for transmission of the another CSI report is insufficient to secure the one or more fields of the another CSI report with the key.

Clause 41. The communications device of clause 40, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 42. The communications device of any of clauses 34 to 41, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 43. The communications device of any of clauses 34 to 42, wherein the at least one processor is further configured to: receive, via the at least one transceiver, an indication of a security priority associated with the CSI report, wherein the CSI report field priority-based security scheme is transmitted in response to the transmitted indication of the security priority associated with the CSI report.

Clause 44. The communications device of any of clauses 34 to 43, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 45. A user equipment (UE), comprising: means for receiving a channel state information (CSI) report field priority-based security scheme for a CSI report with multiple fields; means for determining bit availability in control information (CI) for transmission of the CSI report; means for configuring, based on the CSI report field priority-based security scheme and the CI bit availability, the CSI report with a first subset of the multiple fields being secured via a key and a second subset of the multiple fields being unsecured; and means for transmitting the CSI report.

Clause 46. The UE of clause 45, wherein the CI corresponds to uplink CI (UCI) of physical uplink control channel (PUCCH) or physical uplink shared channel (PUSCH).

Clause 47. The UE of any of clauses 45 to 46, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 48. The UE of clause 47, wherein the CSI report field priority-based security scheme allocates the multiple fields to the first subset in order of field priority until a size of the CSI report exceeds the bit availability.

Clause 49. The UE of any of clauses 47 to 48, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 50. The UE of any of clauses 45 to 49, further comprising: means for determining that another bit availability in another CI for transmission of another CSI report is insufficient to secure one or more fields of the another CSI report with the key; and means for dropping the another CSI report or the one or more fields of the another CSI report based on the insufficiency determination.

Clause 51. The UE of clause 50, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 52. The UE of any of clauses 45 to 51, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 53. The UE of any of clauses 45 to 52, further comprising: means for transmitting an indication of a security priority associated with the CSI report, wherein the CSI report field priority-based security scheme is received in response to the transmitted indication of the security priority associated with the CSI report.

Clause 54. The UE of any of clauses 45 to 53, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 55. The UE of clause 54, wherein the CSI report field priority-based security scheme is configured by the UE or another UE, or wherein the CSI report field priority-based security scheme is configured by a serving base station of the UE.

Clause 56. A communications device, comprising: means for determining a channel state information (CSI) report field priority-based security scheme for a CSI report with multiple fields; means for transmitting, to a user equipment (UE), an indication of the CSI report field prioritization scheme; and means for receiving the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

Clause 57. The communications device of clause 56, wherein the communications device corresponds to a serving base station of the UE, or wherein the communications device corresponds to another UE.

Clause 58. The communications device of any of clauses 56 to 57, wherein the CI corresponds to uplink CI (UCI) of physical uplink control channel (PUCCH) or physical uplink shared channel (PUSCH).

Clause 59. The communications device of any of clauses 56 to 58, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 60. The communications device of clause 59, wherein the CSI report field priority-based security scheme allocates the multiple fields to the first subset in order of field priority until a size of the CSI report exceeds the bit availability.

Clause 61. The communications device of any of clauses 59 to 60, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 62. The communications device of any of clauses 56 to 61, wherein the CSI report field priority-based security scheme instructs the UE to drop another CSI report or one or more fields of the another CSI report if another bit availability in another CI for transmission of the another CSI report is insufficient to secure the one or more fields of the another CSI report with the key.

Clause 63. The communications device of clause 62, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 64. The communications device of any of clauses 56 to 63, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 65. The communications device of any of clauses 56 to 64, further comprising: means for receiving an indication of a security priority associated with the CSI report, wherein the CSI report field priority-based security scheme is transmitted in response to the transmitted indication of the security priority associated with the CSI report.

Clause 66. The communications device of any of clauses 56 to 65, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 67. A non-transitory computer-readable medium storing computer-executable instructions that, when executed by a user equipment (UE), cause the UE to: receive a channel state information (CSI) report field priority-based security scheme for a CSI report with multiple fields; determine bit availability in control information (CI) for transmission of the CSI report; configure, based on the CSI report field priority-based security scheme and the CI bit availability, the CSI report with a first subset of the multiple fields being secured via a key and a second subset of the multiple fields being unsecured; and transmit the CSI report.

Clause 68. The non-transitory computer-readable medium of clause 67, wherein the CI corresponds to uplink CI (UCI) of physical uplink control channel (PUCCH) or physical uplink shared channel (PUSCH).

Clause 69. The non-transitory computer-readable medium of any of clauses 67 to 68, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 70. The non-transitory computer-readable medium of clause 69, wherein the CSI report field priority-based security scheme allocates the multiple fields to the first subset in order of field priority until a size of the CSI report exceeds the bit availability.

Clause 71. The non-transitory computer-readable medium of any of clauses 69 to 70, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 72. The non-transitory computer-readable medium of any of clauses 67 to 71, further comprising computer-executable instructions that, when executed by the UE, cause the UE to: determine that another bit availability in another CI for transmission of another CSI report is insufficient to secure one or more fields of the another CSI report with the key; and drop the another CSI report or the one or more fields of the another CSI report based on the insufficiency determination.

Clause 73. The non-transitory computer-readable medium of clause 72, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 74. The non-transitory computer-readable medium of any of clauses 67 to 73, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 75. The non-transitory computer-readable medium of any of clauses 67 to 74, further comprising computer-executable instructions that, when executed by the UE, cause the UE to: transmit an indication of a security priority associated with the CSI report, wherein the CSI report field priority-based security scheme is received in response to the transmitted indication of the security priority associated with the CSI report.

Clause 76. The non-transitory computer-readable medium of any of clauses 67 to 75, wherein the CI corresponds to sidelink CI (SCI) of physical sidelink control channel (PSCCH) or physical sidelink feedback channel (PSFCH), or wherein the CI corresponds to a medium access control (MAC) command element (CE).

Clause 77. The non-transitory computer-readable medium of clause 76, wherein the CSI report field priority-based security scheme is configured by the UE or another UE, or wherein the CSI report field priority-based security scheme is configured by a serving base station of the UE.

Clause 78. A non-transitory computer-readable medium storing computer-executable instructions that, when executed by a communications device, cause the communications device to: determine a channel state information (CSI) report field priority-based security scheme for a CSI report with multiple fields; transmit, to a user equipment (UE), an indication of the CSI report field prioritization scheme; and receive the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

Clause 79. The non-transitory computer-readable medium of clause 78, wherein the communications device corresponds to a serving base station of the UE, or wherein the communications device corresponds to another UE.

Clause 80. The non-transitory computer-readable medium of any of clauses 78 to 79, wherein the CI corresponds to uplink CI (UCI) of physical uplink control channel (PUCCH) or physical uplink shared channel (PUSCH).

Clause 81. The non-transitory computer-readable medium of any of clauses 78 to 80, wherein the multiple fields comprise: a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

Clause 82. The non-transitory computer-readable medium of clause 81, wherein the CSI report field priority-based security scheme allocates the multiple fields to the first subset in order of field priority until a size of the CSI report exceeds the bit availability.

Clause 83. The non-transitory computer-readable medium of any of clauses 81 to 82, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

Clause 84. The non-transitory computer-readable medium of any of clauses 78 to 83, wherein the CSI report field priority-based security scheme instructs the UE to drop another CSI report or one or more fields of the another CSI report if another bit availability in another CI for transmission of the another CSI report is insufficient to secure the one or more fields of the another CSI report with the key.

Clause 85. The non-transitory computer-readable medium of clause 84, wherein the one or more fields comprise: a precoding matrix indicator (PMI) field, or a rank indicator (RI) field, or an L1 reference signal received power (RSRP) field, or a channel quality indicator (CQI) field, or any combination thereof.

Clause 86. The non-transitory computer-readable medium of any of clauses 78 to 85, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

Clause 87. The non-transitory computer-readable medium of any of clauses 78 to 86, further comprising computer-executable instructions that, when executed by the communications device, cause the communications device to: receive an indication of a security priority associated with the CSI report, wherein the CSI report field priority-based security scheme is transmitted in response to the transmitted indication of the security priority associated with the CSI report.

Clause 88. The non-transitory computer-readable medium of any of clauses 78 to 87, wherein the CI corresponds to sidelink CI (SCI) of physical sidelink control channel (PSCCH) or physical sidelink feedback channel (PSFCH), or wherein the CI corresponds to a medium access control (MAC) command element (CE).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
at least one transceiver; and
at least one processor communicatively coupled to the memory and the at least one transceiver, the at least one processor configured to:
receive, via the at least one transceiver, a channel state information (CSI) report field priority-based security scheme for a CSI report with multiple fields;
determine bit availability in control information (CI) for transmission of the CSI report;
configure, based on the CSI report field priority-based security scheme and the CI bit availability, the CSI report with a first subset of the multiple fields being secured via a key and a second subset of the multiple fields being unsecured; and
transmit, via the at least one transceiver, the CSI report.

2. The UE of claim 1, wherein the CI corresponds to uplink CI (UCI) of physical uplink control channel (PUCCH) or physical uplink shared channel (PUSCH).

3. The UE of claim 1, wherein the multiple fields comprise:
a precoding matrix indicator (PMI) field, or
an L1 reference signal received power (RSRP) field, or
a wideband (WB) channel quality indicator (CQI) field, or
a subband (SB) CQI field, or
a wideband (WB) rank indicator (RI) field, or
an SB RI field, or
a CSI reference signal (CSI-RS) resource indicator (CRI) field, or
a strongest layer indicator (SLI) field, or
any combination thereof.

4. The UE of claim 3, wherein the CSI report field priority-based security scheme allocates the multiple fields to the first subset in order of field priority until a size of the CSI report exceeds the bit availability.

5. The UE of claim 3,
wherein the CSI report field priority-based security scheme allocates a first priority to the PMI field and the L1 RSRP field,
wherein the CSI report field priority-based security scheme allocates a second priority that is lower than the first priority to the WB CQI field and the WB RI field,
wherein the CSI report field priority-based security scheme allocates a third priority that is lower than the second priority to the SB CQI field and the SB RI field, and
wherein the CSI report field priority-based security scheme allocates a fourth priority that is lower than the third priority to the CRI field and the SLI field.

6. The UE of claim 1, wherein the at least one processor is further configured to:
determine that another bit availability in another CI for transmission of another CSI report is insufficient to secure one or more fields of the another CSI report with the key; and
drop the another CSI report or the one or more fields of the another CSI report based on the insufficiency determination.

7. The UE of claim 6, wherein the one or more fields comprise:
a precoding matrix indicator (PMI) field, or
a rank indicator (RI) field, or
an L1 reference signal received power (RSRP) field, or
a channel quality indicator (CQI) field, or
any combination thereof.

8. The UE of claim 1,
wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

9. The UE of claim 1, wherein the at least one processor is further configured to:

transmit, via the at least one transceiver, an indication of a security priority associated with the CSI report, wherein the CSI report field priority-based security scheme is received in response to the transmitted indication of the security priority associated with the CSI report.

10. The UE of claim 1, wherein the CI corresponds to sidelink CI (SCI) of physical sidelink control channel (PSCCH) or physical sidelink feedback channel (PSFCH), or wherein the CI corresponds to a medium access control (MAC) command element (CE).

11. The UE of claim 10, wherein the CSI report field priority-based security scheme is configured by the UE or another UE, or wherein the CSI report field priority-based security scheme is configured by a serving base station of the UE.

12. A communications device, comprising:

a memory;

at least one transceiver; and at least one processor communicatively coupled to the memory and the at least one transceiver, the at least one processor configured to:

determine a channel state information (CSI) report field priority-based security scheme for a CSI report with multiple fields;

transmit, via the at least one transceiver, to a user equipment (UE), an indication of the CSI report field prioritization scheme; and receive, via the at least one transceiver, the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

13. The communications device of claim 12, wherein the communications device corresponds to a serving base station of the UE, or wherein the communications device corresponds to another UE.

14. The communications device of claim 12, wherein the CI corresponds to uplink CI (UCI) of physical uplink control channel (PUCCH) or physical uplink shared channel (PUSCH).

15. The communications device of claim 12, wherein the multiple fields comprise:

a precoding matrix indicator (PMI) field, or an L1 reference signal received power (RSRP) field, or a wideband (WB) channel quality indicator (CQI) field, or a subband (SB) CQI field, or a wideband (WB) rank indicator (RI) field, or an SB RI field, or a CSI reference signal (CSI-RS) resource indicator (CRI) field, or a strongest layer indicator (SLI) field, or any combination thereof.

16. The communications device of claim 15, wherein the CSI report field priority-based security scheme allocates the multiple fields to the first subset in order of field priority until a size of the CSI report exceeds the bit availability.

17. The communications device of claim 15, wherein the CSI report field priority-based security scheme allocates a first priority to the PMI field and the L1 RSRP field, wherein the CSI report field priority-based security scheme allocates a second priority that is lower than the first priority to the WB CQI field and the WB RI field, wherein the CSI report field priority-based security scheme allocates a third priority that is lower than the second priority to the SB CQI field and the SB RI field, and wherein the CSI report field priority-based security scheme allocates a fourth priority that is lower than the third priority to the CRI field and the SLI field.

18. The communications device of claim 12, wherein the CSI report field priority-based security scheme instructs the UE to drop another CSI report or one or more fields of the another CSI report if another bit availability in another CI for transmission of the another CSI report is insufficient to secure the one or more fields of the another CSI report with the key.

19. The communications device of claim 18, wherein the one or more fields comprise:

a precoding matrix indicator (PMI) field, or a rank indicator (RI) field, or an L1 reference signal received power (RSRP) field, or a channel quality indicator (CQI) field, or any combination thereof.

20. The communications device of claim 12, wherein the CSI report field priority-based security scheme is based upon a security quality of service (QoS), or wherein the CSI report field priority-based security scheme is based upon a security priority indication, or wherein the CSI report field priority-based security scheme is based upon a CSI report index, or wherein the CSI report field priority-based security scheme is based upon a bandwidth part (BWP) identifier or component carrier (CC) identifier, or any combination thereof.

21. The communications device of claim 12, wherein the at least one processor is further configured to:

receive, via the at least one transceiver, an indication of a security priority associated with the CSI report, wherein the CSI report field priority-based security scheme is transmitted in response to the transmitted indication of the security priority associated with the CSI report.

22. The communications device of claim 12, wherein the CI corresponds to sidelink CI (SCI) of physical sidelink control channel (PSCCH) or physical sidelink feedback channel (PSFCH), or wherein the CI corresponds to a medium access control (MAC) command element (CE).

23. A method of operating a user equipment (UE), comprising:

receiving a channel state information (CSI) report field priority-based security scheme for a CSI report with multiple fields;

determining bit availability in control information (CI) for transmission of the CSI report;

configuring, based on the CSI report field priority-based security scheme and the CI bit availability, the CSI report with a first subset of the multiple fields being secured via a key and a second subset of the multiple fields being unsecured; and transmitting the CSI report.

24. The method of claim 23,
wherein the CI corresponds to uplink CI (UCI) of physical uplink control channel (PUCCH) or physical uplink shared channel (PUSCH), or
wherein the CI corresponds to sidelink CI (SCI) of physical sidelink control channel (PSCCH) or physical sidelink feedback channel (PSFCH), or wherein the CI corresponds to a medium access control (MAC) command element (CE).

25. The method of claim 23, wherein the multiple fields comprise:
a precoding matrix indicator (PMI) field, or
an L1 reference signal received power (RSRP) field, or
a wideband (WB) channel quality indicator (CQI) field, or
a subband (SB) CQI field, or
a wideband (WB) rank indicator (RI) field, or
an SB RI field, or
a CSI reference signal (CSI-RS) resource indicator (CRI) field, or
a strongest layer indicator (SLI) field, or
any combination thereof.

26. The method of claim 23,
wherein the CSI report field priority-based security scheme is based upon a security quality of service (QoS), or
wherein the CSI report field priority-based security scheme is based upon a security priority indication, or
wherein the CSI report field priority-based security scheme is based upon a CSI report index, or
wherein the CSI report field priority-based security scheme is based upon a bandwidth part (BWP) identifier or component carrier (CC) identifier, or
any combination thereof.

27. A method of operating a communications device, comprising:
determining a channel state information (CSI) report field priority-based security scheme for a CSI report with multiple fields;
transmitting, to a user equipment (UE), an indication of the CSI report field prioritization scheme; and
receiving the CSI report based on the CSI report field priority-based security scheme and a bit availability in control information (CI) for transmission of the CSI report, wherein the CSI report is configured with a first subset of the multiple fields being secured via a key and a second subset of the multiple fields being unsecured.

28. The method of claim 27,
wherein the communications device corresponds to a serving base station of the UE, or
wherein the communications device corresponds to another UE.

29. The method of claim 27,
wherein the CI corresponds to uplink CI (UCI) of physical uplink control channel (PUCCH) or physical uplink shared channel (PUSCH), or
wherein the CI corresponds to sidelink CI (SCI) of physical sidelink control channel (PSCCH) or physical sidelink feedback channel (PSFCH), or
wherein the CI corresponds to a medium access control (MAC) command element (CE).

30. The method of claim 27, wherein the multiple fields comprise:
a precoding matrix indicator (PMI) field, or
an L1 reference signal received power (RSRP) field, or
a wideband (WB) channel quality indicator (CQI) field, or
a subband (SB) CQI field, or
a wideband (WB) rank indicator (RI) field, or
an SB RI field, or
a CSI reference signal (CSI-RS) resource indicator (CRI) field, or
a strongest layer indicator (SLI) field, or
any combination thereof.

* * * * *